US007661959B2

(12) United States Patent
Green et al.

(10) Patent No.: US 7,661,959 B2
(45) Date of Patent: Feb. 16, 2010

(54) INTERIOR DESIGN SYSTEM AND METHOD

(75) Inventors: Deborah A. Green, Hendersonville, TN (US); Casey K. Green, Huntsville, AL (US); Edward O. Green, Huntsville, AL (US)

(73) Assignee: Minutes Matter Solutions, Inc., Hendersonville, TN (US)

( * ) Notice: Subject to any disclaimer, the term of this patent is extended or adjusted under 35 U.S.C. 154(b) by 802 days.

(21) Appl. No.: 10/691,275

(22) Filed: Oct. 22, 2003

(65) Prior Publication Data

US 2005/0091008 A1 Apr. 28, 2005

Related U.S. Application Data

(60) Provisional application No. 60/504,298, filed on Sep. 19, 2003.

(51) Int. Cl.
*G09B 25/00* (2006.01)

(52) U.S. Cl. .............................. 434/75; 434/72; 434/79

(58) Field of Classification Search .................. 434/72, 434/75, 79
See application file for complete search history.

(56) References Cited

U.S. PATENT DOCUMENTS

| | | | | |
|---|---|---|---|---|
| 5,252,071 | A | 10/1993 | Hansard | |
| 5,368,485 | A | 11/1994 | Phillips | |
| 5,601,431 | A | 2/1997 | Howard | |
| 5,751,829 | A * | 5/1998 | Ringland et al. | 382/100 |
| 6,005,969 | A * | 12/1999 | Thomas et al. | 382/162 |
| 6,122,391 | A | 9/2000 | Ringland et al. | |
| 6,572,377 | B2 | 6/2003 | Masters | |
| 2001/0047250 | A1 * | 11/2001 | Schuller et al. | 703/1 |
| 2002/0006602 | A1 | 1/2002 | Masters | |
| 2002/0007920 | A1 | 1/2002 | Lower | |
| 2002/0030689 | A1 | 3/2002 | Eichel et al. | |
| 2002/0064301 | A1 | 5/2002 | Sonnenberg et al. | |
| 2003/0084104 | A1 | 5/2003 | Salem et al. | |

* cited by examiner

*Primary Examiner*—Cameron Saadat
(74) *Attorney, Agent, or Firm*—Lanier Ford Shaver & Payne P.C.; Jon E. Holland

(57) ABSTRACT

An interior design system of the present disclosure can comprise a user interface configured to display a plurality of interior design components. The system may further comprise logic configured to receive a user selection of one of the components and display the selected component in the user interface. The logic may further be configured to receive a plurality of user inputs, via the user interface, the inputs related to characteristics of the selected component.

19 Claims, 23 Drawing Sheets

200

INTERIOR DESIGN SYSTEM AND METHOD

CROSS REFERENCE TO RELATED APPLICATION

This application claims priority to U.S. Provisional Application No. 60/504,298, entitled "Interior Design System and Method," and filed on Sep. 19, 2003, which is incorporated herein by reference.

BACKGROUND

Interior designers typically provide their clients assistance when determining color schemes to be used in a particular area within their home, e.g., a bedroom, a bathroom. In this regard, the designer may help the client in selecting a particular color for a wall or a group of walls and/or to select fabrics for window treatments and/or furniture, such that the selections provide consistency and interplay between multiple rooms throughout the home. Thus, it is aesthetically important that the color flow, including the paint chosen for the walls and the fabrics chosen for window treatments, are consistently complementary.

In addition to assisting the clients in determining color schemes and fabrics for furniture and window treatments throughout the home, the interior designer further provides assistance to clients in selecting, for example, window treatment components and/or bedding components. As used throughout, a "window treatment component" refers to the separate design selections that one can use when designing an entire window. Further, one can select various types of window, e.g., a bay window, a casement window, a cathedral window, an awning window, a hopper window, a double hung window, a single hung window, etc. After selecting the type of window, one can select various window treatments, including, but not limited to panel types and valance types. A "panel" refers to that part of the window treatment that actually covers the window, itself. A "valance" refers to that part of the window treatment that is ornamental and is situated at the top edge of the window. These are only examples of the various types of window treatment components. In addition, window treatments may include any various type of blind, such as, for example venetian blinds, or window scarf, which is a piece of fabric draped over the pole or rod at the top of a window.

Typically, the window treatments that include panels are comprised of a primary fabric. The panel can be designed in various ways. For example, the panel may take the form of puddled curtains, which are curtains with long side panels allowed to drape and puddle onto the floor.

In addition to helping clients' design window treatments, many interior designers also help their clients to design bedding, such as, for example, comforters and pillows. In this regard, the designer also helps to complement colors and fabrics of the bedding with those colors and fabrics used in the design and implementation of the room and/or home, i.e., window treatments.

Typically, such designing is effectuated via a measuring board that an interior designer writes upon to retain notes regarding measuring, fabric likes and dislikes of the client, color likes and dislikes of the client, and general information needed in order to meet a client's needs. For example, the designer could sketch, based upon the height and width of the wall and the placement of windows on the wall in accordance with a client's room. The designer might then sketch upon top of the windows various window treatment components, as described hereinabove.

In addition, interior designers might use transparent layers that comprise various window treatments. The designer can then layer the various transparencies of window treatment components or hardware on top of a representation of the client's wall. Thus, the client can get an idea of the contemplated look and feel of the wall after the design is implemented.

SUMMARY

Generally, a system of the present invention enables a user to design the interior of a structure, e.g., a house, by providing a plurality of design components and a workshop area displayed to a computer screen that the user employs to place components selected.

An interior design system of the present disclosure can comprise a user interface configured to display a plurality of interior design components. The system may further comprise logic configured to receive a user selection of one of the components and display the selected component in the user interface. The logic may further be configured to receive a plurality of user inputs, via the user interface, the inputs related to characteristics of the selected component.

Another embodiment of the present disclosure provides an interior design method that comprises displaying a plurality of interior design components via a user interface. The method further comprises receiving a user selection of one of the components, displaying the selected component in the user interface, and receiving a plurality of user inputs from a user, via the user interface, the inputs related to characteristics of the selected component.

BRIEF DESCRIPTION OF THE DRAWINGS

The invention can be better understood with reference to the following drawings.

DETAILED DESCRIPTION

The present invention generally pertains to a system and method for assisting users in designing and implementing various design components in a client-defined space, i.e., a room in the client's home, or a room in the client's office. Note that "design components," as used herein and throughout, refer to distinct and separable components that can be united to form a single object. For example, a wall comprises "structural design components" that may include, for example, a window, a door, crown molding, or a chair rail. Further, a window comprises "window treatment design components" that may include panels, valances, balloons, rods, finials, and/or tiebacks. As another example, a room may include "furniture design components" that may include tables, chairs, pictures, lamps, couches, and bookshelves.

In light of the foregoing description of design components, the present invention specifically provides a computer system that allows a user to create a graphical representation of the client-defined space and incorporate desired design components into the graphical representation. In this regard, the system enables a user to incorporate such things as furniture design components, window design components, door design components, window treatment design components, and/or bedding design components, hereinafter referred to collectively as design components, into a graphical representation of the client-defined space. The system then may provide a graphical representation of a design of a room(s) incorporating the design components relative to the structure. Further, the present invention allows a user to measure and quote the alternative configurations of design components used in the design.

Figure 1:
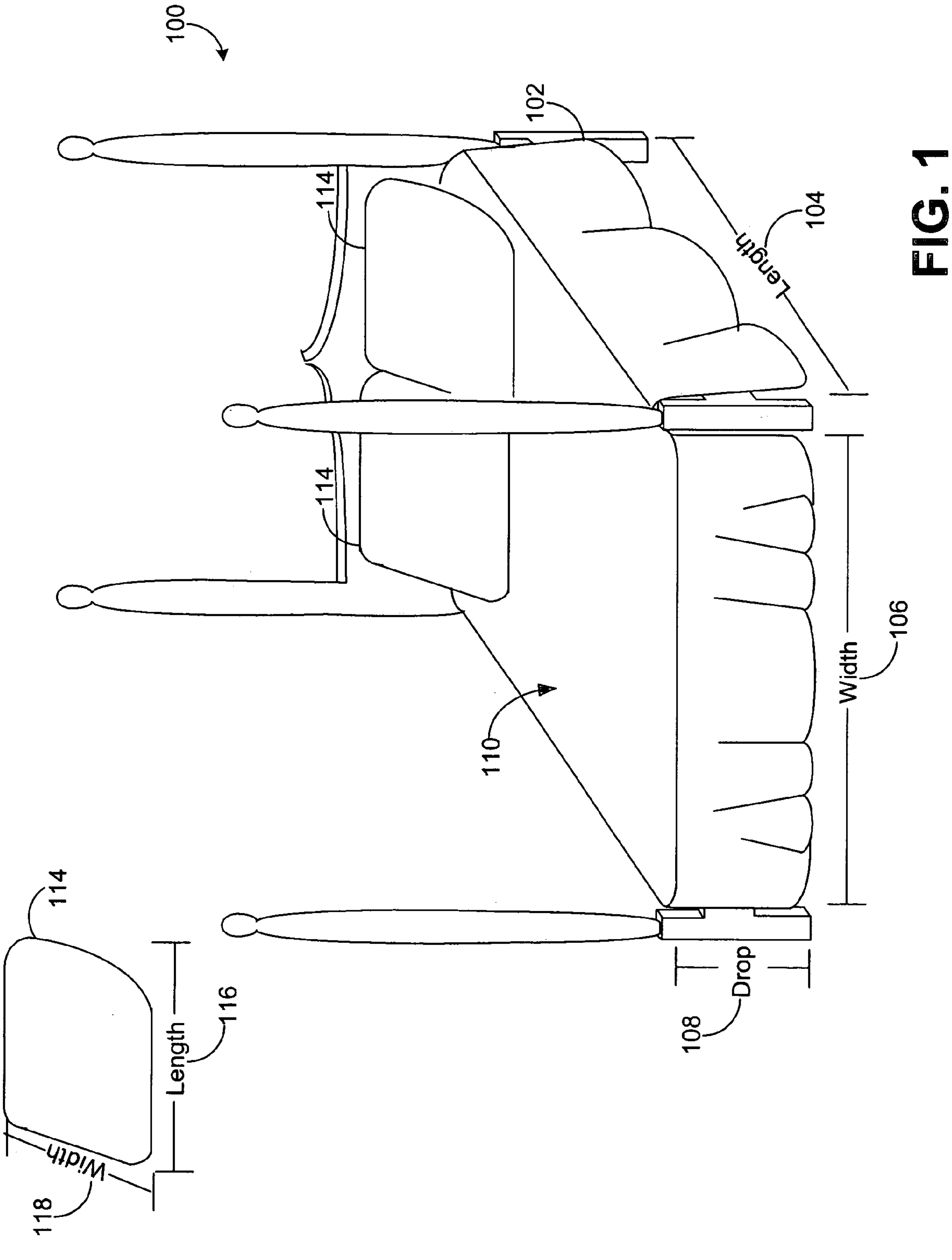
FIG. 1 illustrates an exemplary bed depicting dimensions that are preferably used in calculating yardage requirements for bedding.

In this regard, it is helpful to note exemplary manual methods of obtaining measurements and providing quotes with respect to, for example, a set of windows and bedding. Thus, FIG. 1 illustrates a bed 100 that is covered with a comforter 102, and a set of rectangular pillows 114. The comforter 102 has a length 104, a width 106, and a drop 108. Note that the drop refers the distance from the top of the bed 110 to a floor (not shown).

An interior designer preferably calculates the amount of yardage needed to create the comforter 102 by the following calculation:

$$\text{Yardage}=(\text{Width of Mattress } \mathbf{106}+2(\text{Drop } \mathbf{108})+\text{hem})\times(\text{Length of Mattress } \mathbf{104}+\text{Drop } \mathbf{108}+\text{Hem}+\text{Pillow Tuck}) \qquad \text{Equation A.1}$$

Thus, the product described provides an interior designer with the amount of yardage needed to create the comforter, which is preferably made using a single fabric type. In addition, the yardage needed for the fabric for the pillows 114 can be determined by the following calculations:

$$\text{Yardage for One Pillow } \mathbf{114}=2(\text{Width } \mathbf{118})(\text{Length } \mathbf{116}) \qquad \text{Equation A.2}$$

In order to determine the price of creating the comforter, the interior designer then determines the unit price of the fabric that is to be used, which is a specified value, e.g., "x" dollars per yard, and the designer uses the following formula to determine the cost making the bedding:

$$(\text{Total Yardage})(x)+(\text{labor cost})+(\text{installation cost})=\text{Total Cost of Bedding} \qquad \text{Equation A.3}$$

where the "Total Yardage" is equal to the yardage for creating the comforter and the yardage for creating the pillows. Therefore, after some calculation, the designer provides a client with the price of creating the comforter 102.

Figure 2B:
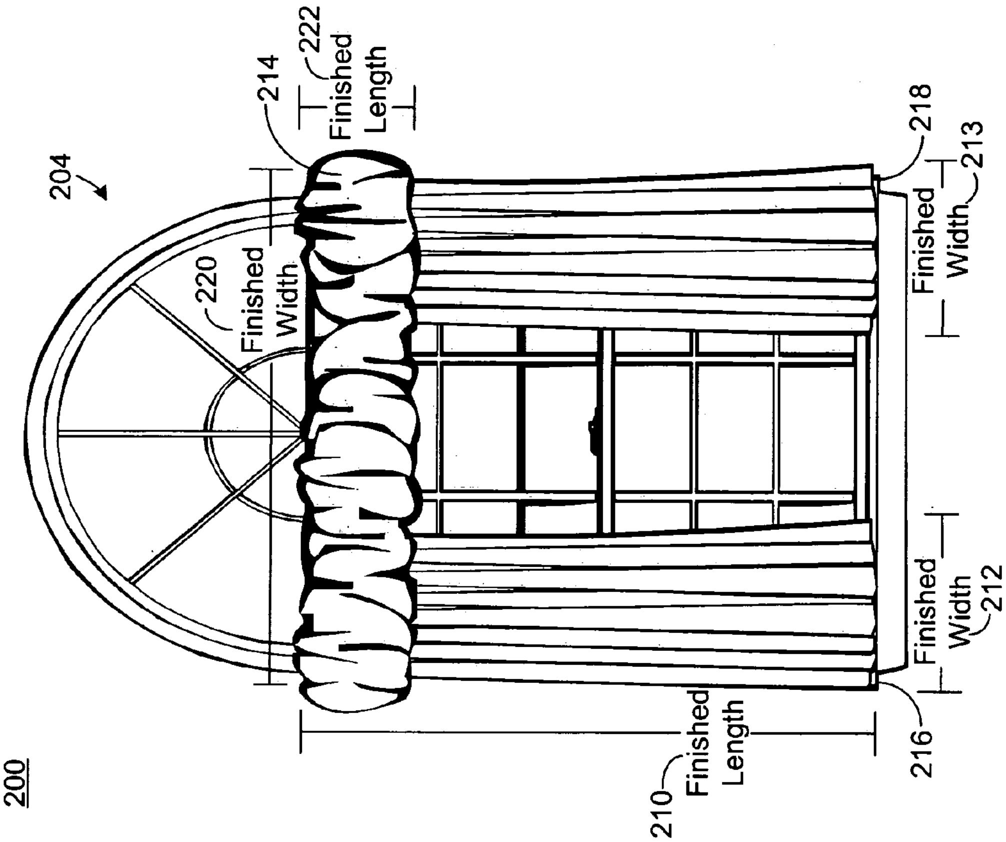
FIG. 2B illustrates the window of FIG. 2A having exemplary window treatments in accordance with the dimensions as indicated.
Figure 2A:
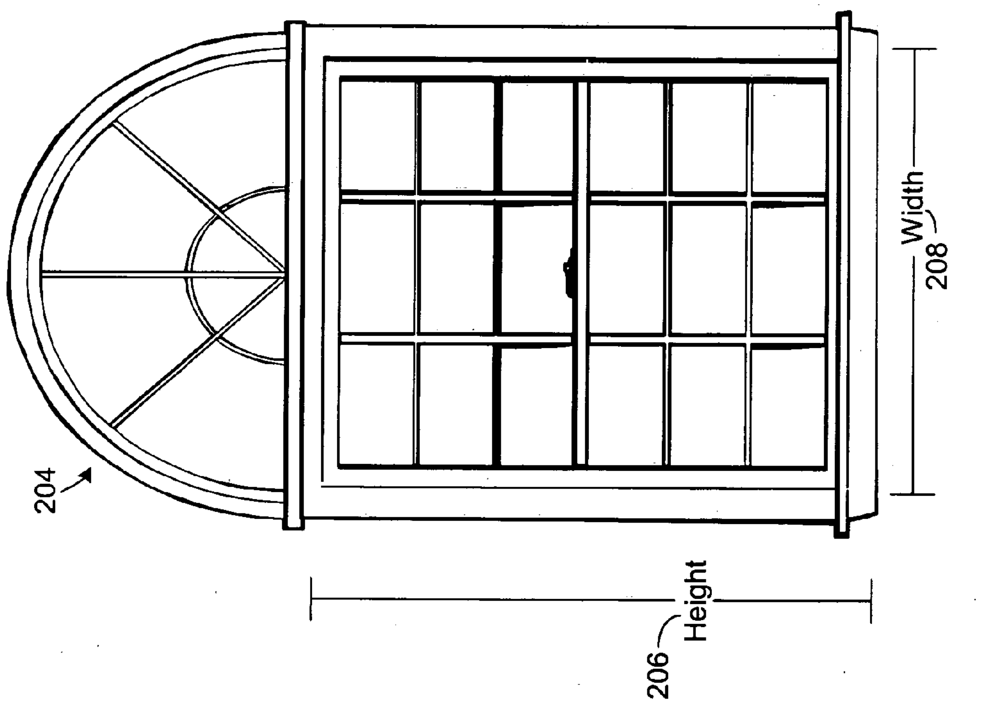
FIG. 2A illustrates an exemplary window depicting dimensions that are preferably used in calculating yardage requirements for window treatments.

Another example is illustrated in FIG. 2. FIG. 2A depicts a wall 200 having a single hung window with arch 204. FIG. 2B depicts the same window 204 having window treatment design components, including two panels 216 and 218 positioned on either side of the window 204 and a valance 214 positioned on top of the window 204. Thus, material is needed for both the panels 216 and 218 and the valance 214.

Generally, a designer uses the height 206 and the width 208 of the window 204 to determine the amount of yardage that may be needed in order to create the window treatments illustrated in FIG. 2B. In this regard, to create the panels 216 and 218, the designer uses the following formula:

Yardage for One Panel 216=Finished Length 210+Hem+Break on Floor+Mounting Allowance+Heading where the "finished length" is the actual length measurement of the treatment after installation, the "hem" is that portion of the fabric that is turned up at each cut of the fabric, the "break on the floor" refers to the extra amount of fabric that lays on the floor, the "mounting allowance" is the extra amount of fabric needed to staple treatment to a board or pole, and the "heading" refers to the fabric that extends up past a rod or board on which the fabric is mounted.

The fullness of the panel can be calculated using the following formula:

Yardage for Fullness of One Panel 216=Finished Width 212 (Fullness Ratio), where the "finished width" refers to the actual width measurement of treatment after installation and the fullness ratio is a predetermined value that depends upon the desired look of the panel. Note that the standard ratio is three times the finished width.

Thus, the designer can then determine the cost to create a window panel 216. Such cost can be calculated as follows:

Total Cost=(Yardage for Panel+Labor cost+Installation Cost)

Figure 2C:
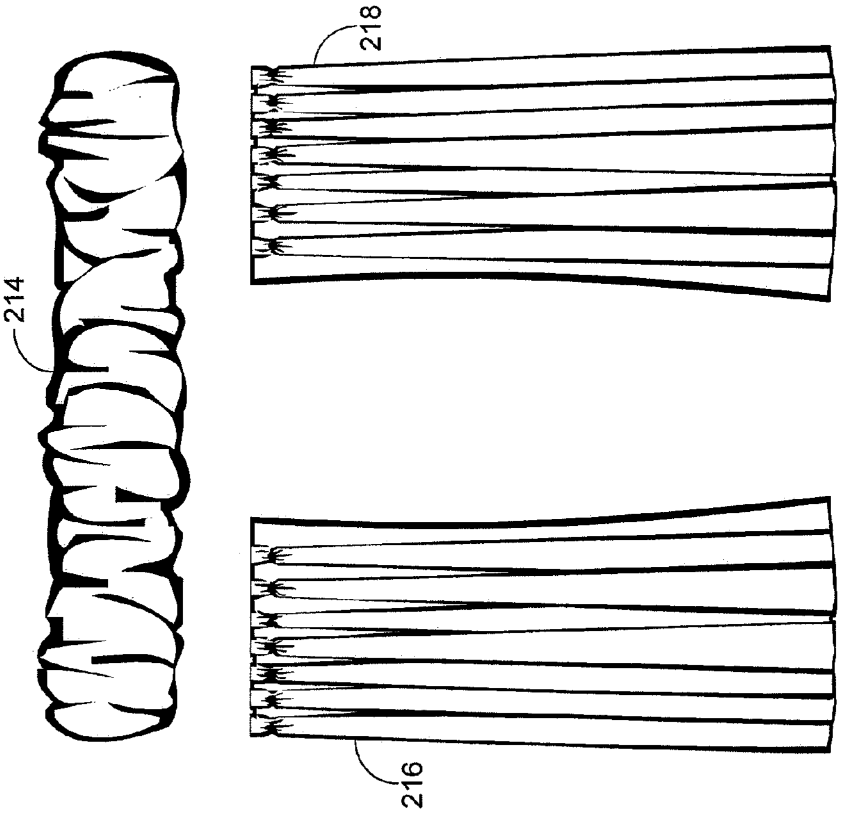
FIG. 2C illustrates each window treatment component of the window treatment as shown in FIG. 2B.

FIG. 2C depicts each window treatment component that makes up the window treatment design illustrated in FIG. 2B. Notably, each separate design component, including the panel 216, the panel 218, and valance 214, exhibits different characteristics, e.g., yardage cost, labor cost, and/or special instruction characteristics. For example, the panel 216 may comprise a doubled four (4) inch hem requirement and a rod pocket (RP) requirement that is to be considered when determining total yardage. The nature of the design components generally and the use of each design component's basic characteristics are described in more detail hereinafter, relative to the present disclosure.

Figure 3:
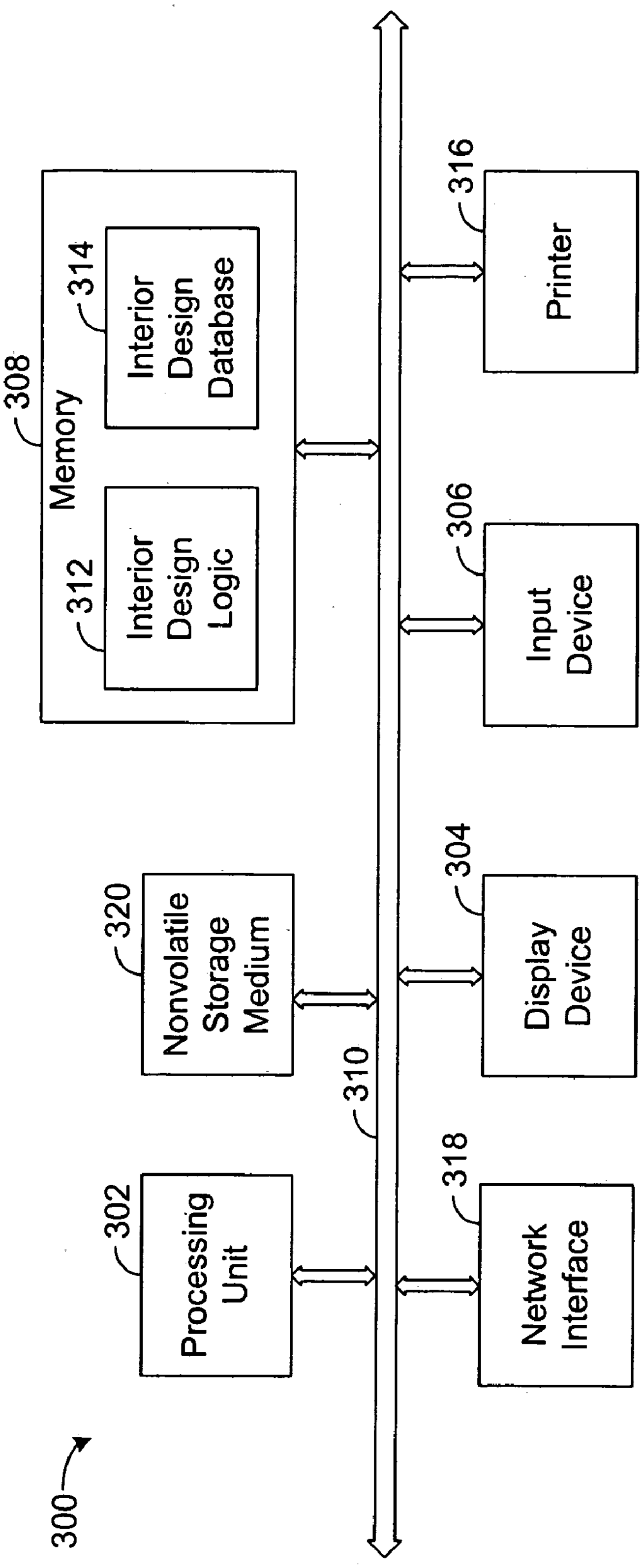
FIG. 3 illustrates an exemplary interior design system in accordance with an embodiment of the present invention.

A system 300 of the present invention is illustrated in FIG. 3. The system 300 comprises generally a processing unit 302, a display device 304, an input device 306, and memory 308. Like conventional memory, memory 308 includes various locations for storing data, and each of these locations is preferably identified by an address.

In the embodiment depicted by FIG. 3, an interior design database 314 and interior design logic 312 are stored in memory 308. The interior design logic 312 can comprise executable code that is compiled from source code, which is a human readable representation of the program interior design logic 312. The interior design logic 312 can be compiled and executed or interpreted by the processing unit 302. Note that the source code from which the interior design logic 312 is derived can be created in any of the various types of programming languages known in the art, such as, for example C, C++, Java, Visual Basic, or the like. Further note that the database 314 can be any type of database known in the art, such as, for example a relational database or a linear database.

The processing unit 302 of system 300, for example a digital signal processor (DSP), communicates to and drives the other elements within the system 300 via a local interface 310, which can include one or more buses. Furthermore, the input device 306, for example, a keyboard or a mouse, can be used to input data from a user of the system 300, and a display device 304 or a printer 316 can be used to output data to the user.

Note that the interior design logic 312 and the interior design database 314 are preferably implemented in software and can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In addition, the system 300 preferably comprises a network interface 318, which may connect the system 300 to a local area network (LAN), a wide area network (WAN), a T1 line, or a cable modem. Further, the system 300 may comprise a storage medium, such as, for example a hard drive, a zip drive, a compact disc read only memory (CDROM) drive, or a tape drive.

The database 314 preferably stores a plurality of design component images indicative of a plurality of design components. For example, the database 314 might store images representative of the panels 216 (FIG. 2C) and 218 (FIG. 2C) and the valance 214 (FIG. 2C). In addition to storing the images, the database 314 preferably stores data indicative of specific characteristics associated with each design component, and the database preferably associates the design component's characteristic data with its image data.

In one embodiment, the database 314 comprises a file system containing multiple folders, wherein each folder represents a design component type, such as, for example, a structural components folder, a window treatment folder, and/or a furniture folder. Within each folder, there may be subsets of each type of design component type. For example, the structural component folder may comprise sub-folders for windows and doors. Ultimately, traversing the multiple design component folders and sub-folders preferably leads to image files representative of the design components. For example, the windows sub-folder preferably comprises image files representative of types of windows, e.g., single window with arch, single window, double window with arch, and double window.

In such embodiment, the sub-folder comprising the image files may further comprise data files associated with each image file that contain design component characteristic data corresponding to its associated image. In such a configuration of the database 314, the interior design logic 312 is preferably configured to perform a search on the file structure to retrieve an image of a particular design component that may be requested by a user via the input device 306, which is described further with reference to FIG. 4-FIG. 20. Note that design component characteristic data encompasses any design data that might be used in creating the design component. For example, if the design component image is a drapery panel, then the data characteristics may include, but are not limited to, suggested values or requirements related to finished length (FL), finished width (FW), hem, break, rod pocket (RP) and/or mounting allowance.

In another embodiment, the nonvolatile storage medium 320 may comprise a CDROM drive. In this regard, a user of the system 300 may insert a CDROM into the nonvolatile storage medium 320 containing image files representative of design components. In addition, the image files may have embedded into the image the design component characteristic data described herein.

In one embodiment of the system 300, images stored in the database 314 are stored in a vector-based graphics format. Thus, the two-dimensional images of each design component can be displayed in pages on the Web and each file is a compact size with resolution independence, i.e., the image can scale down or up to fit proportionally into any size display. Notably, the images can depict two-dimensional or three-dimensional images depending upon the application. The images representative of the design components are created through text-based commands formatted to comply with XML, therefore, the image files can themselves be searched and the image files can be linked internally to other SVG file, for example, design component characteristic data files.

The network interface 318 can be used to receive and transmit data over a network as described herein. Thus, the interior design logic 312 may comprise a web server, such that the interior design logic 312 receives server requests related to the interior design system 300. Further, the interior design logic 312 may transmit hypertext markup language (HTML) documents representative of the various graphical user interfaces, described in detail herein, which are used to effectuate the interior design logic 312.

An embodiment of the interior design logic 312 is now described with reference to FIGS. 4-20.

Figure 4:
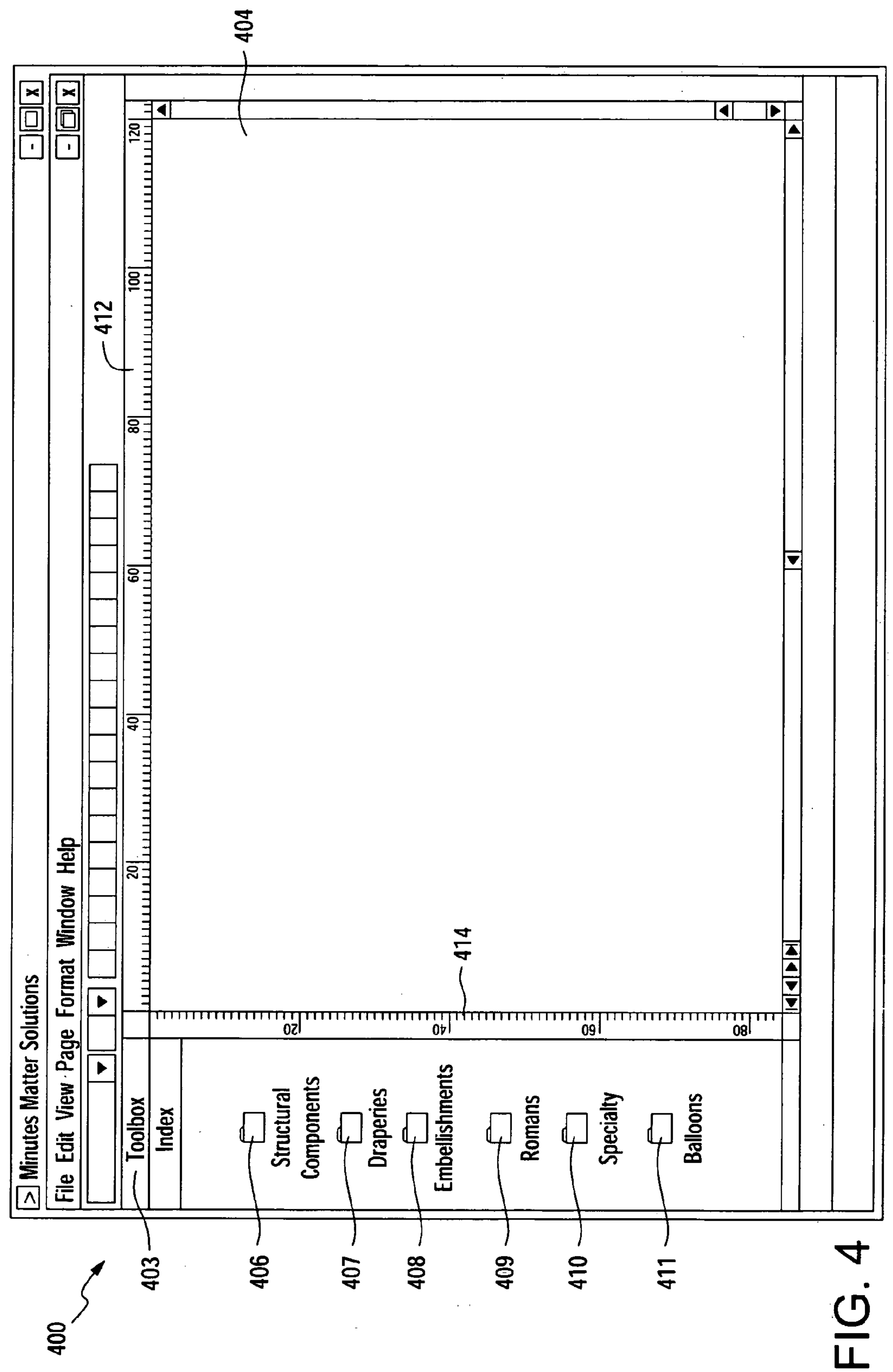
FIG. 4 illustrates an exemplary graphical user interface (GUI) of the interior design system of FIG. 3 exhibiting an exemplary index link set in a toolbox in accordance with an embodiment of present invention.
Figure 5:
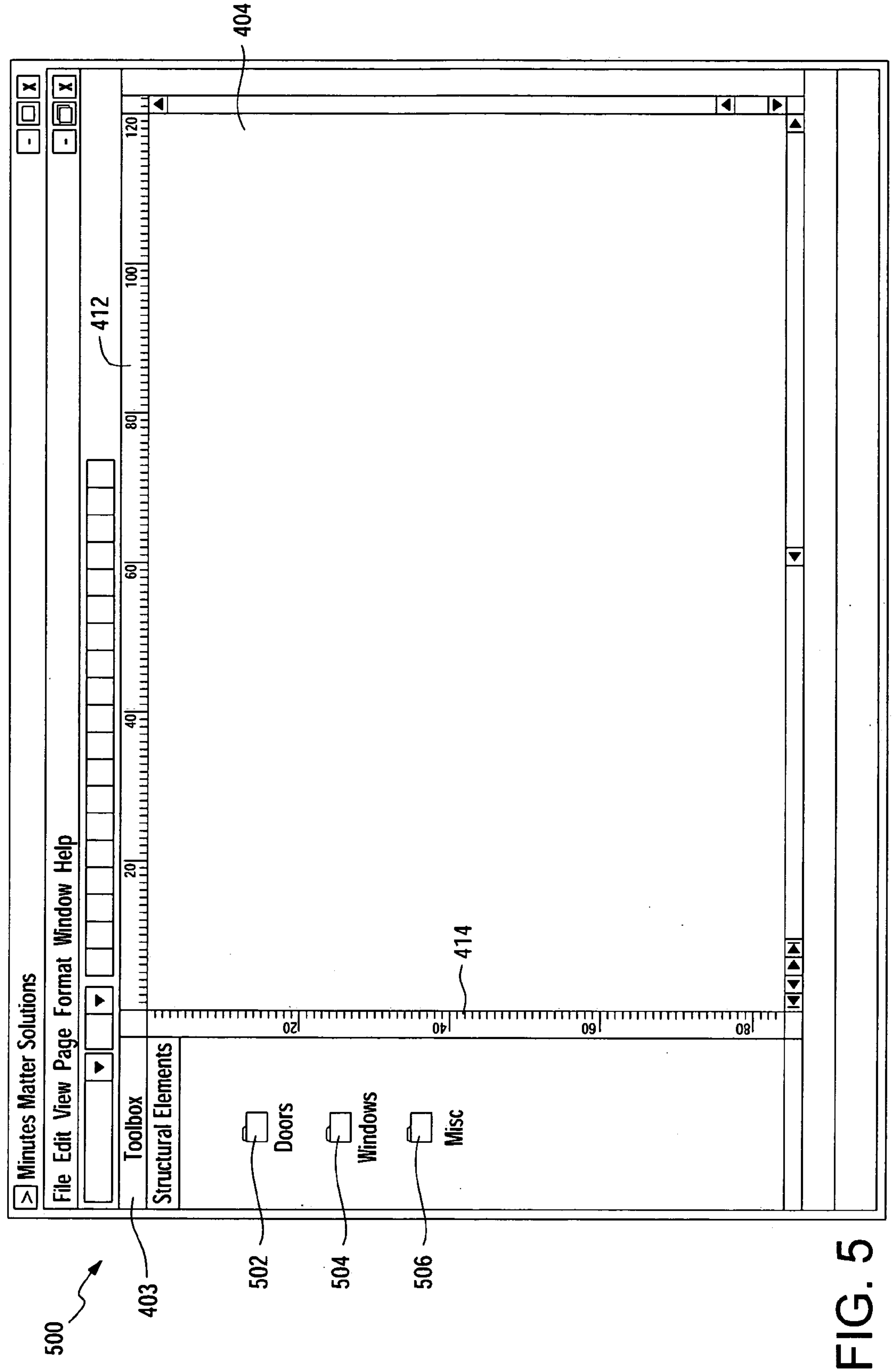
FIG. 5 illustrates an exemplary GUI of the interior design system of FIG. 3 exhibiting an exemplary structural element link set in the toolbox in accordance with an embodiment of the present invention.
Figure 6:
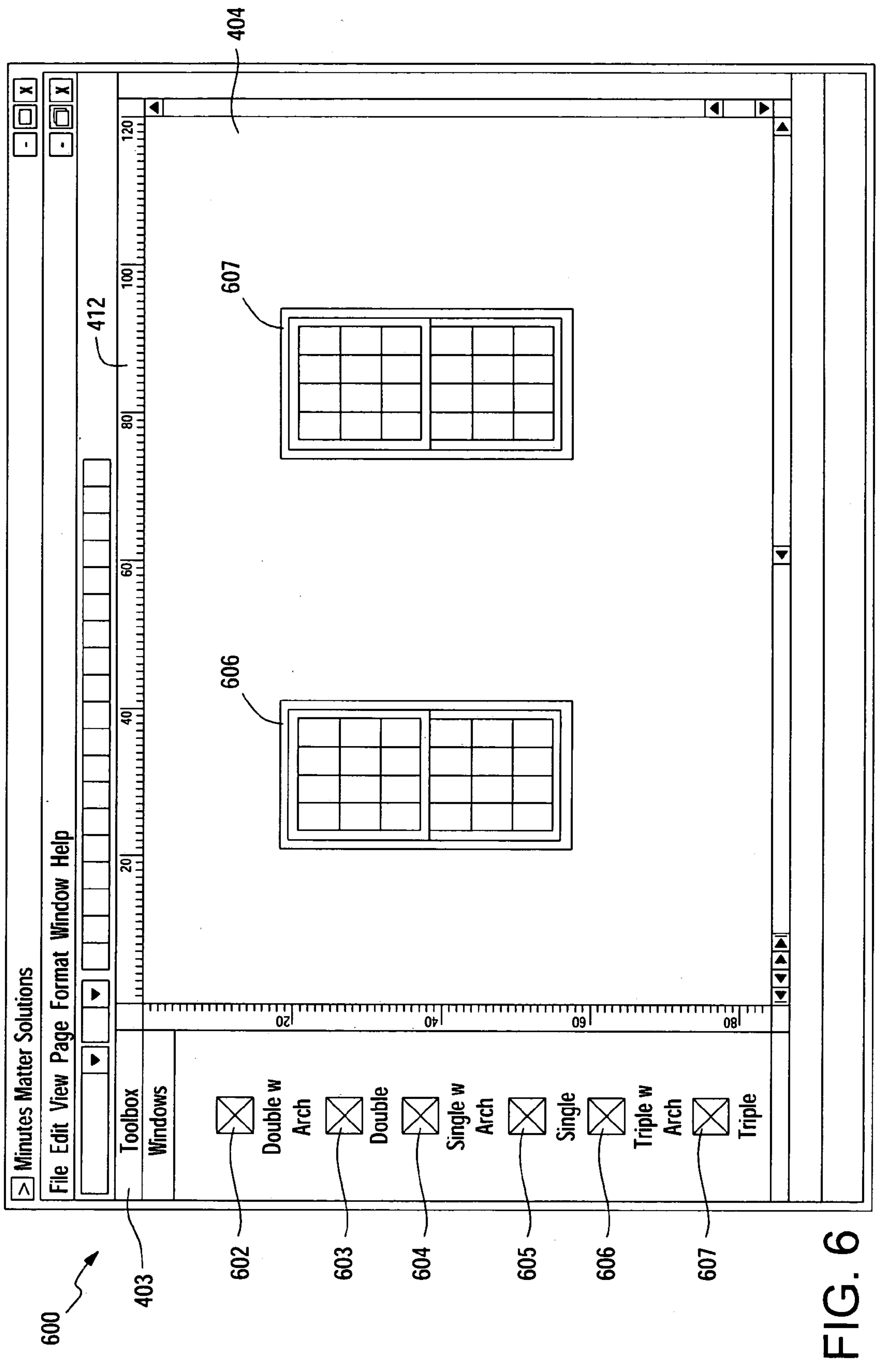
FIG. 6 illustrates an exemplary GUI of the interior design system of FIG. 3 exhibiting a windows design component set in the toolbox and exhibiting two window structural design components in accordance with an embodiment of the present invention.

The interior design logic 312 is preferably implemented in a windows-type environment, and the logic 312 displays to display device 304 the graphical user interface (GUI) 400, as depicted in FIG. 4. The interface 400 preferably comprises a toolbox 403 and a workshop 404. Note that the "workshop" 404 refers to that portion of the GUI that a user can manipulate, i.e., the user can select design components and drop onto the workshop 404 a graphical representation of the design component selected.

The toolbox 403 preferably enables the user of the interior design logic 312 a visual depiction of various links, e.g., links 406-411. Preferably, the lines 406-411 are such that, when selected, e.g., single clicked or double clicked via a user input device 306 (FIG. 3), such as, for example a mouse, then the logic 312 displays in the toolbox 403 a new set of links or a set of icons representative of design components related or corresponding to the link selected. Such selection of hierarchical links and corresponding design components are described further hereinafter, as subsequent related GUIs are illustrated and described.

The toolbox 403 preferably provides multiple links to a plurality of hierarchies, including but not limited to a link 406 to a hierarchy of structural components, as described herein, such as, for example, windows and doors. In addition, the toolbox preferably provides a link to hierarchies of other interior design components, such as, for example, a drapery link 407, an embellishment link 408, a roman link 409, a specialty link 410, and a balloon link 411. Such links providing access to the various hierarchies of links and design components are merely exemplary and representative of the many various types of links and/or hierarchies that may be used in providing a user with a variety of functionality.

Note that a "link" as used in this disclosure refers to a selectable icon or other representation or the like that, when selected, provides a set of links related to the selected link or a set of design component choices related to the selected link. Further note that a "hierarchy" or "hierarchies" as used in this disclosure refers to a collection of design components that have common characteristics, and the hierarchy provides a user with a logical method of accessing the various design components that may be accessed through the various links.

The links 406-411 are represented in the GUI 400 with file folder icons, and each file folder icon has a textual description, i.e., structural components, draperies, embellishments, Romans, specialty, and balloons. Note, however, that the type of icon used in such implementation of the present invention is not pivotal to the invention, and such icons can be selected for aesthetic, identification, or functional purposes, depending upon the type of application for which the invention may be used.

Some of the links and their corresponding hierarchies are now described in more detail, for illustrative purposes. In this regard, the draperies link 407, when selected, provides a user access to drapery design components, including, but not limited to panels. Note that, as described herein, a panel refers to that portion of window treatments that drapes the panes of the window, which can encompass the entire window or only portions of the window.

The embellishments link 408, when selected, displays either a list of links or design components related to, for example, hardware design components or trim design components associated with draperies, furniture, or some other type of element or structure. In the case of draperies, the embellishments link might display a hardware link that, when selected, displays a list of drapery rods, rings, or finials. Note that a drapery rod can include a tension rod, which stays in place inside a window frame, or a traverse rod, which is an adjustable rod that opens and closes the window treatment by pulling a cord. Further note that a finial is a decorative piece attached to each end of a drapery rod.

The Romans link 409, when selected, displays either a list of links or design components related to, for example, roman shades. In this regard, there are a plurality of different types of roman shades. Note that a roman shade is a type of shade that is drawn up from the bottom by a cord or a ring, and when the shade is drawn up the rings or cord create horizontal folds.

The specialty link 410, when selected, provides a list of links or design components related to miscellaneous accessories. For example, the specialty link 410 might display a list of links comprising a lamp link, a picture link, or a molding link. The user may then have access to various type of design components for a variety of lamps, pictures, or molding that the user can make use of in an interior design.

Likewise, the balloons link 411, when selected, displays either a list of links or a list of design components related to balloon shades. Note that balloon shades are fabric shades that have inverted pleats that fall into rounded poufs at the bottom of the shade.

Notably, with respect to FIG. 4, regardless of the types of links 406-411 that are provided to the user and regardless of the types of design components accessible through the links 406-411, the functional aspect of the toolbox 403 is to enable a user access to a plurality of graphical representations of design components that the user can select and drag to the workshop 404. The selection and drag process is described in more detail herein.

Within the workshop 404 a user creates a graphical depiction by selecting and dragging to the workshop 404 a combination of design components provided in the toolbox 403.

The logic 312 preferably provides multiple tasks that enable a user to more proficiently design in the workshop 404. For example, the logic 312 may allow a user to select a design component, drag it to the workshop, and drop it at a particular point in the workshop 404. The logic 312 may enable the user to select the dropped design component and perform various functions relating to it, e.g., copy it, paste it, rotate it.

In addition, the logic 312 may allow a user to enter a desired position of a structural design element on the workshop 404 representative of a wall. For example, a user may enter into a text field (not shown) data indicative of the selected structural component, which indicates that the structure is five (5) inches from the left corner and twelve (12) inches from the floor. Thus, the logic 312 may then automatically place the structural element selected at that position.

The workshop 404 can take many forms. For example, the workshop 404 can have a visible grid that allows a user to estimate approximate placement of a structure, for example a window or a door. Further, the workshop 404 may comprise rulers 412 and 414, which represent the distance, in inches, of a work area, i.e., a wall. The logic 312 may display a default workshop 404, which as shown in FIG. 4 is 120 inches in width by 84 inches in height. In addition to providing a default for the work area, the logic 312 may also enable a user to enter into a text field(s) a ceiling height and a wall length, which the logic 312 may then use to determine the work area so that the useable portion of the workshop 404 is maximized.

For illustrative purposes, assume that a user selects, via an input device 306, the structural components link 406. Upon selection of such link, the logic 312 displays the GUI 500 depicted in FIG. 5, which comprises a set of links, preferably including, but not limited to a doors link 502, a windows link 504, and a miscellaneous link 506.

Assume again that the user selects, via an input device 306, the windows link 504. Upon selection of the windows link 504, the logic 312 displays the GUI 600 of FIG. 6, which comprises a set of design component icons, preferably including, but not limited to a double window with arch design component 602, a double window component 603, a single window with arch component 604, a single window component 605, a triple window with arch component 606, and a triple window 607. Note that the design components 602-607 can be represented in the GUI 600 with thumbnails of the design component image that each represents. In addition, the icons may comprise a textual description, such as is shown.

The user then selects the design component 602-607 desired, drags the icon to the workshop 404, and drops the graphic represented by the corresponding icon onto the workshop 404. Thus, in the example provided, the user selected the single window design component 605 and dragged the icon to a position and dropped the window 606 onto the workshop 404. Thus, the logic 312 displays in the workshop 404 a wall 84 inches in height and 120 inches in width having a single structural design component, window 606. Further, the user selects the single window component icon 605, drags a the icon 605 onto the workshop and drops the window 607 into the workshop 404.

For illustrative purposes, assume that the user selects the draperies link 407 (FIG. 4), and the logic 312 displays a set of links wherein one of the set is a link to panels (not shown). Assume that the user selects the panels link, and the logic 312 displays the GUI 700 of FIG. 7. The GUI 700 comprises a toolbox 403 that comprises various panel design components including, but not limited to, a pinch pleat (full) 704, a pinch pleat (half) 705, a pinch pleat 706, a plain top (large) 707, and a plain top (small) 708. In the same manner that the user selects and drops structural components, with reference to FIG. 6, the user selects and drops window treatment design components. Thus, the user selects the pinch pleat (half) design component 705, drags it onto the workshop 404, and drops the panel design component 710 on top of the window 606. As described herein, the logic 312 may be configured to automatically snap and/or glue the panel design component 710 to the window design component 606. Further, the user performs the same process for the window design component 607, i.e., the user selects the pinch pleat design component 705, drags the icon to the window component 607 and drops it on the window component 607.

In this regard, the logic 312 may provide the user text fields (not shown) for entering position data relative to the pleat design component 710 and the window 606. Further, while the user is dragging the graphic to be dropped, the logic 312 may highlight the underlying graphic, e.g., the window design component 606, while the user has the graphic that is being dragged, e.g., pleat design component 710, in a position on top of the window graphic 606. Thus, the logic 312 may automatically place the pleat design component 710 if the user drops the pleat design component 710 anywhere on the window design component 606.

In this regard, the logic 312 may automatically align the pleat design component 710 with respect to the window design component 606. Therefore, if there were multiple structural graphics, e.g., two window graphics, then the user could drag the pleat graphic over the workshop until the structure to which the user desires to attach the pleat graphic is highlighted, then simply drop the pleat graphic. The logic 312 would then align it and snap it to its associated window.

Figure 8:
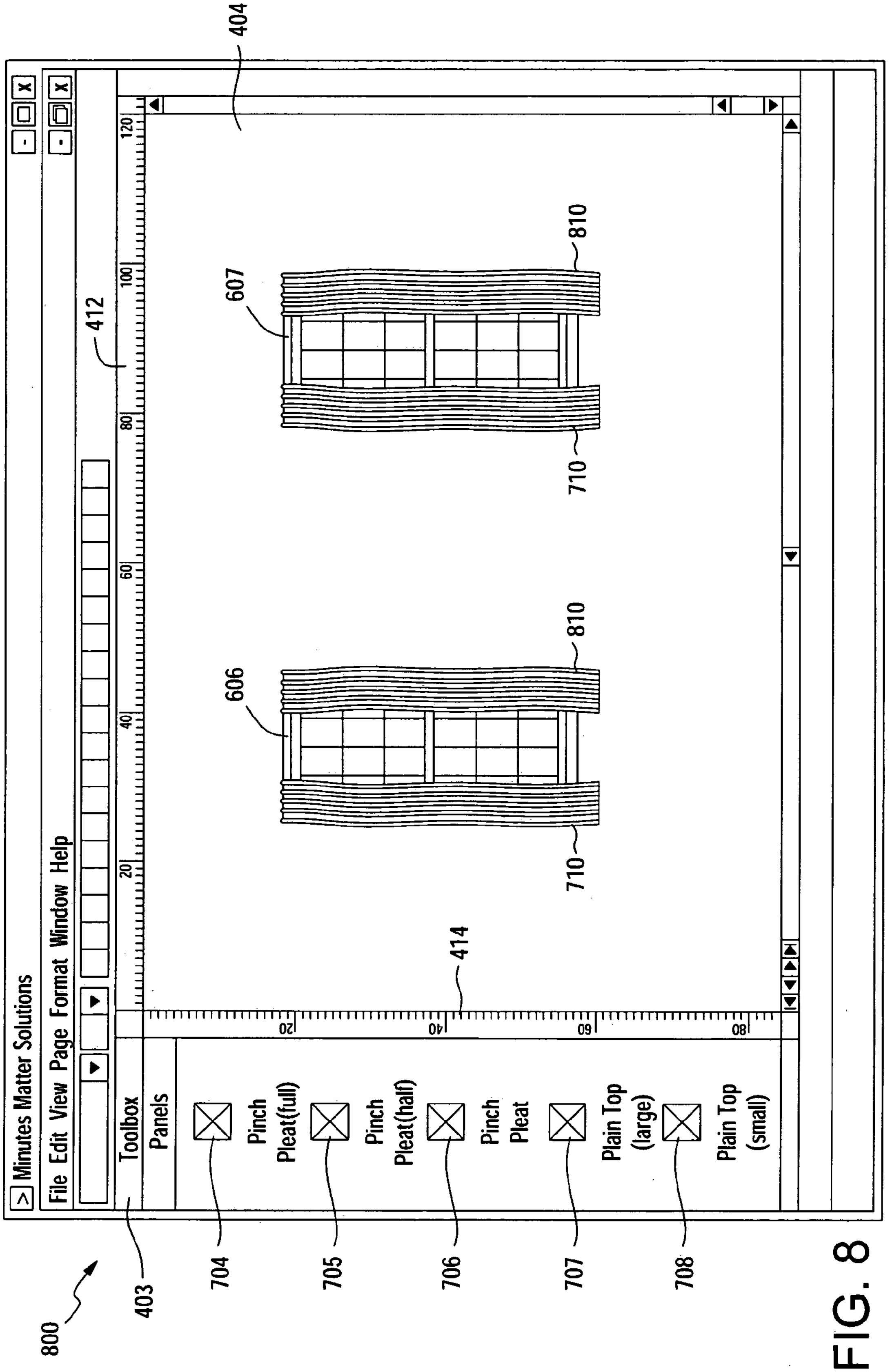
FIG. 8 illustrates an exemplary GUI of the interior design system of FIG. 3 exhibiting a panels design component set in the toolbox and exhibiting two window structural design components each having two window treatment design components in accordance with an embodiment of the present invention.

Likewise, FIG. 8 depicts a GUI 800 wherein the user has placed a corresponding pinch pleat design component 810 onto the window component 606 and the window design component 607. The user may accomplish this feat by either selecting the corresponding design component 705, dragging the icon 705 corresponding to the design component to the position where the user desires it to be, then dropping the component 810 on the window component 606 and 607. In addition, however, the user may copy the design component 710 and paste the copy onto the workshop 404. Assuming that the component 810 does not have to be further manipulated, e.g., rotated, then the user can simply move the component 810 to the window 606 and 607. Various other methods known in the art may be used to manipulate the components, e.g., window component 606, pleat component 710, and pleat component 810.

Figure 7:
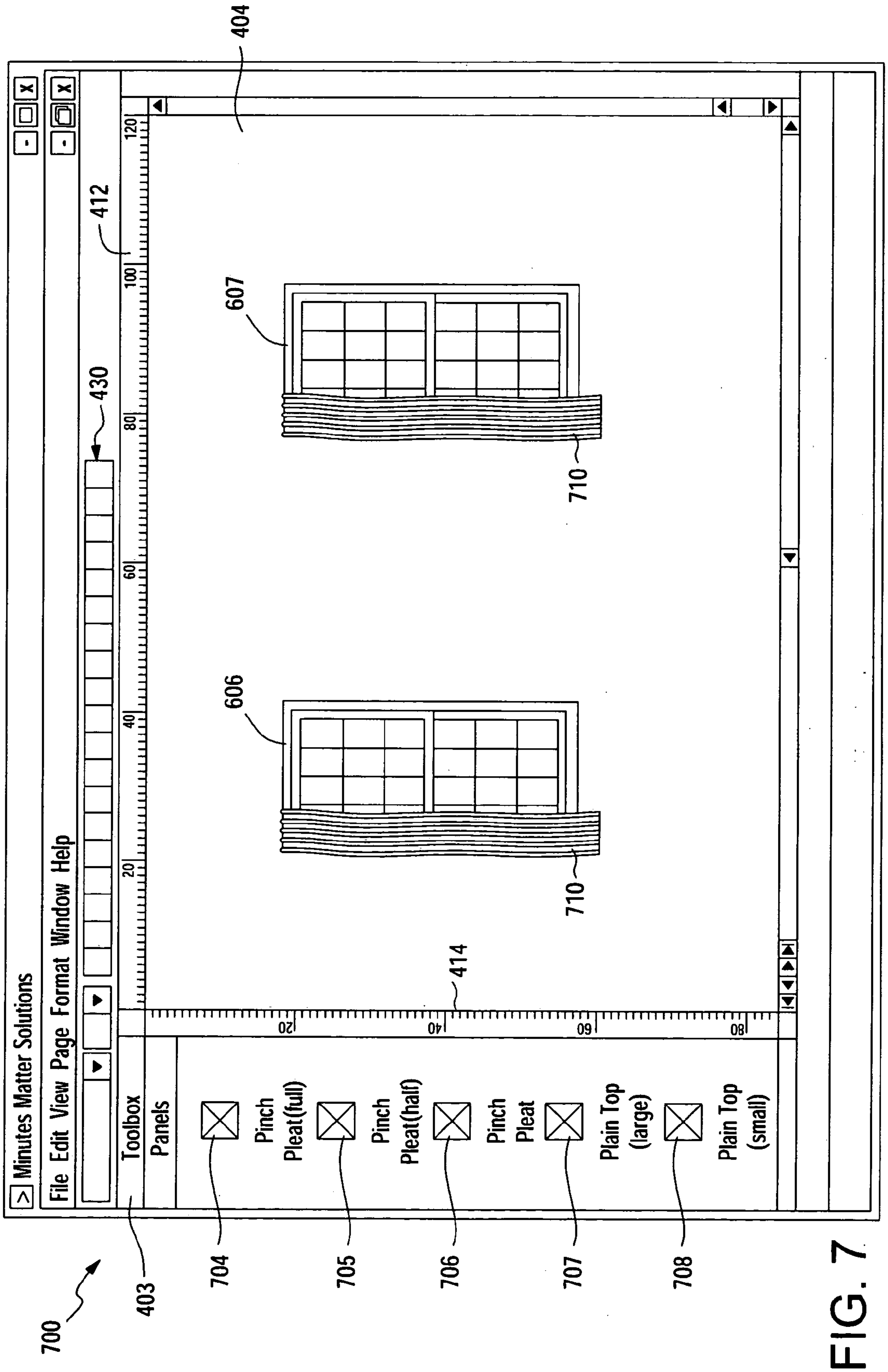
FIG. 7 illustrates an exemplary GUI of the interior design system of FIG. 3 exhibiting a panels design component set in the toolbox and exhibiting two window structural design components having a single window treatment design components each.
Figure 9:
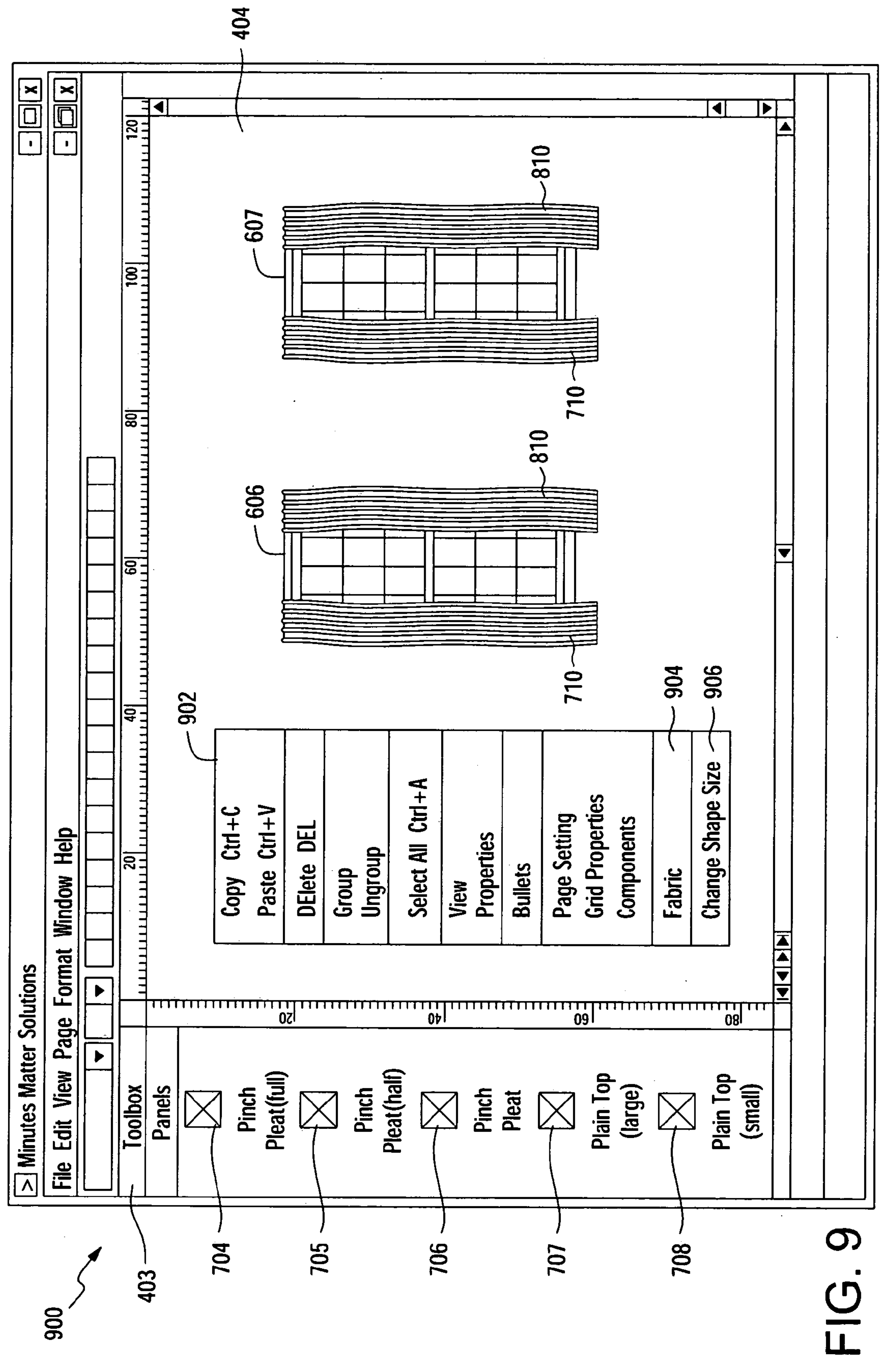
FIG. 9 illustrates an exemplary GUI of the interior design system of FIG. 3 exhibiting a panels design component set in the toolbox and exhibiting two window structural design components each having two window treatment design components and illustrating a drop down window in accordance an embodiment of the present invention.

After the user has completed designing, then the user can then select a fabric for the panels selected with reference to FIG. 7 and FIG. 8. With reference to FIG. 9, the logic 312 may display the GUI 900. Via the GUI 900 and the input device 306, the user may select one of the components 606, 607, 710, or 810. The user may then pull down a menu 902 and select the "fabric" link 904. The logic 312 may enable the user to pull down the menu 902 in any number of ways, for example, the user can right click on the selected component(s) in order for the logic 312 to display the menu 902.

Figure 10:
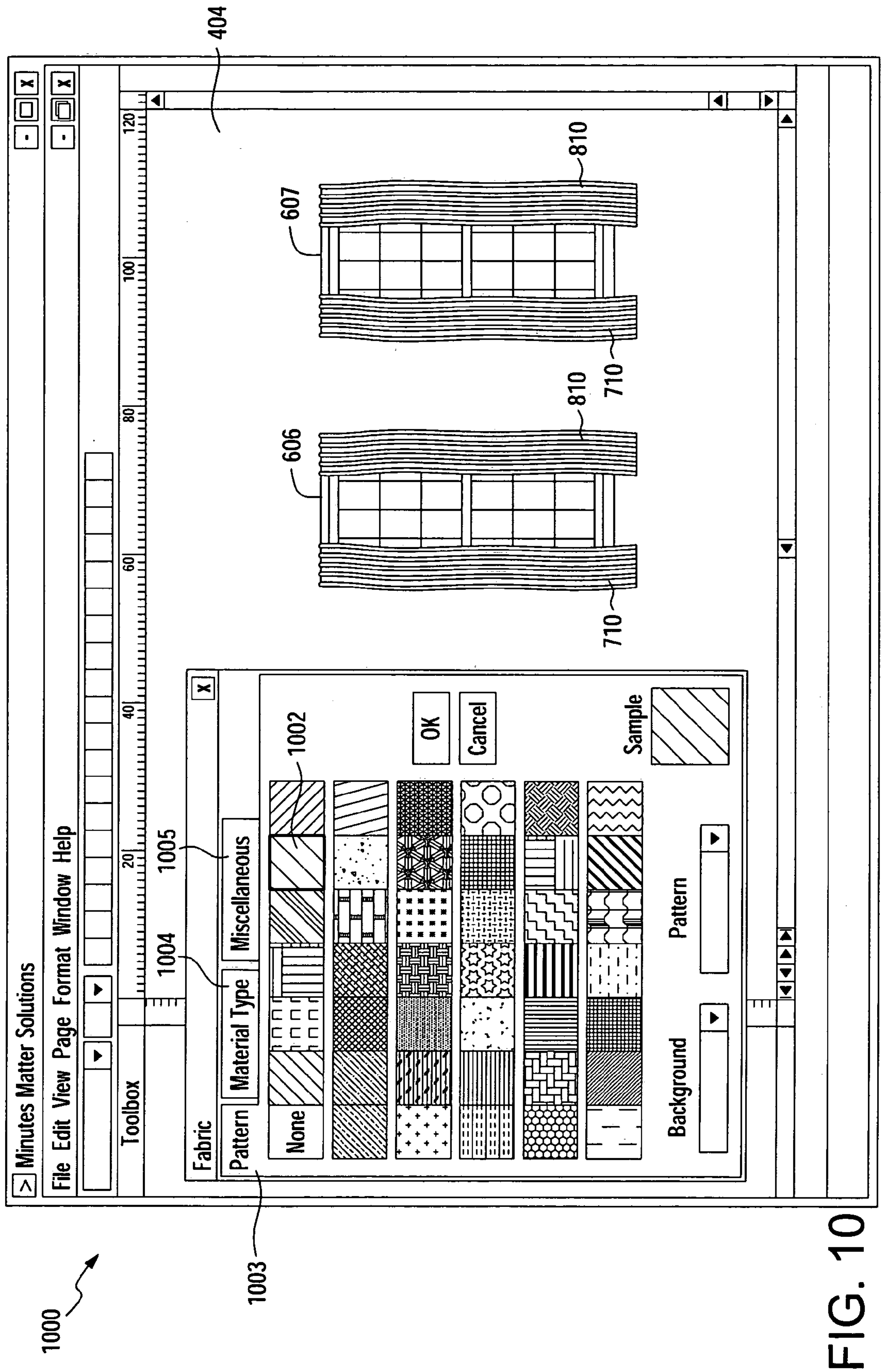
FIG. 10 illustrates an exemplary GUI of the interior design system of FIG. 3 exhibiting two window structural design components and a fabric selection window in accordance with an embodiment of the present invention.

When the user selects the fabric button 904, the logic 312 preferably displays the GUI 1000 of FIG. 10 comprising the fabric pattern window 1003, the material type window 1004, and the miscellaneous window 1005. Therefore, if the user selects a desired fabric from the array of images representative of fabric swatches 1002, then the component currently selected is tiled with the fabric selected. Note that the material type window 1004 may enable the user to select the type of material that the user desires, i.e., corduroy, cotton, rayon, and the miscellaneous window 1005 may enable the user to select other characteristics related to the fabric selection, e.g., vendor. Furthermore, a user may define their own fabric swatches by employing a scanner to scan in the images representative of the fabric.

Figure 11:
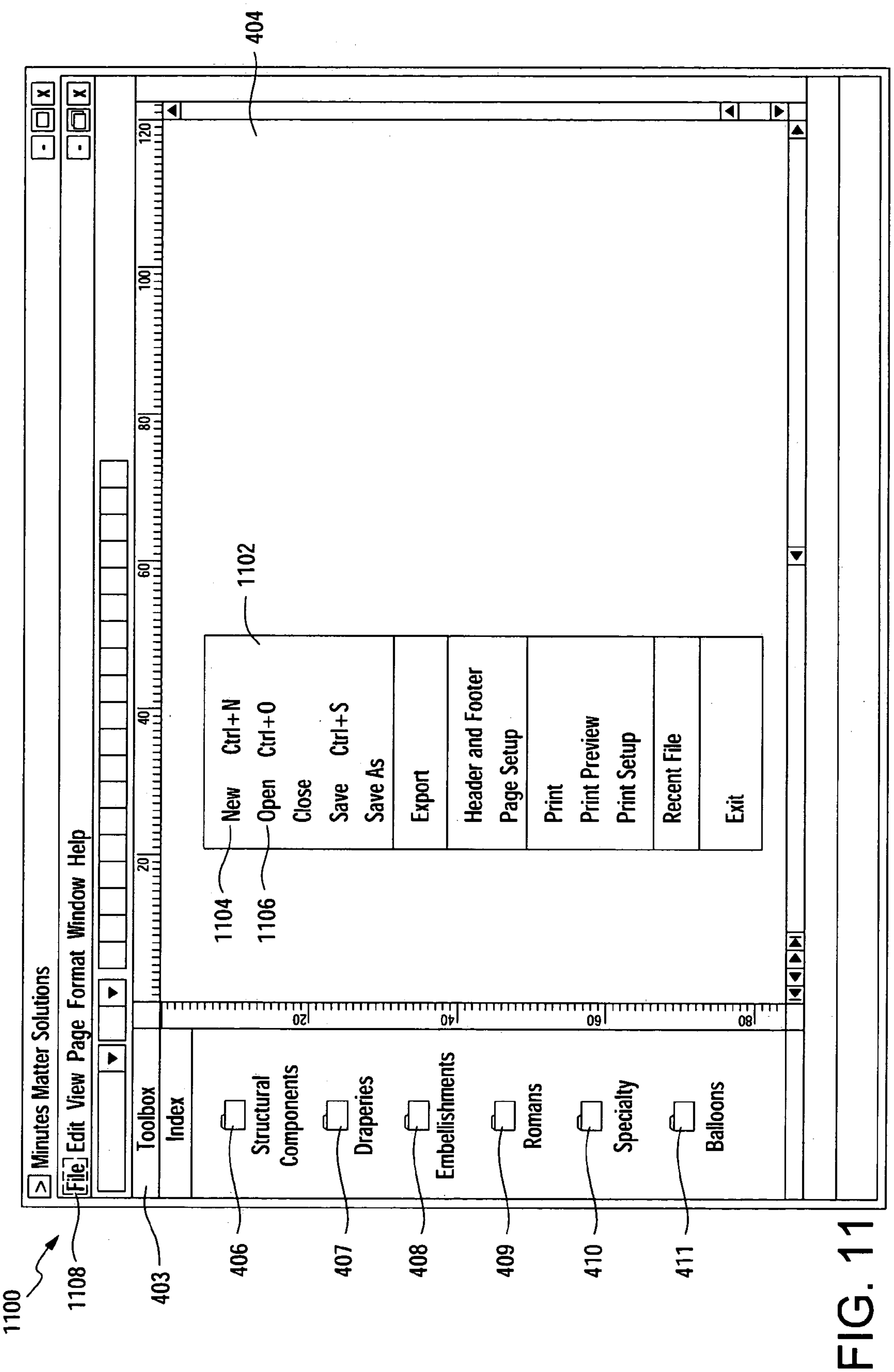
FIG. 11 illustrates an exemplary GUI of the interior design system of FIG. 3 exhibiting a pull down window in accordance with an embodiment of the present invention

FIG. 11 illustrates a GUI 1100, which is an exemplary GUI of the present invention. If the user selects the "file" button 1108 and the logic 312 displays the pull down menu 1102, then the user may create a "new" client via selecting "new" 1104. Further, the user may desire to open an existing client by selecting "open" 1106.

Figure 12:
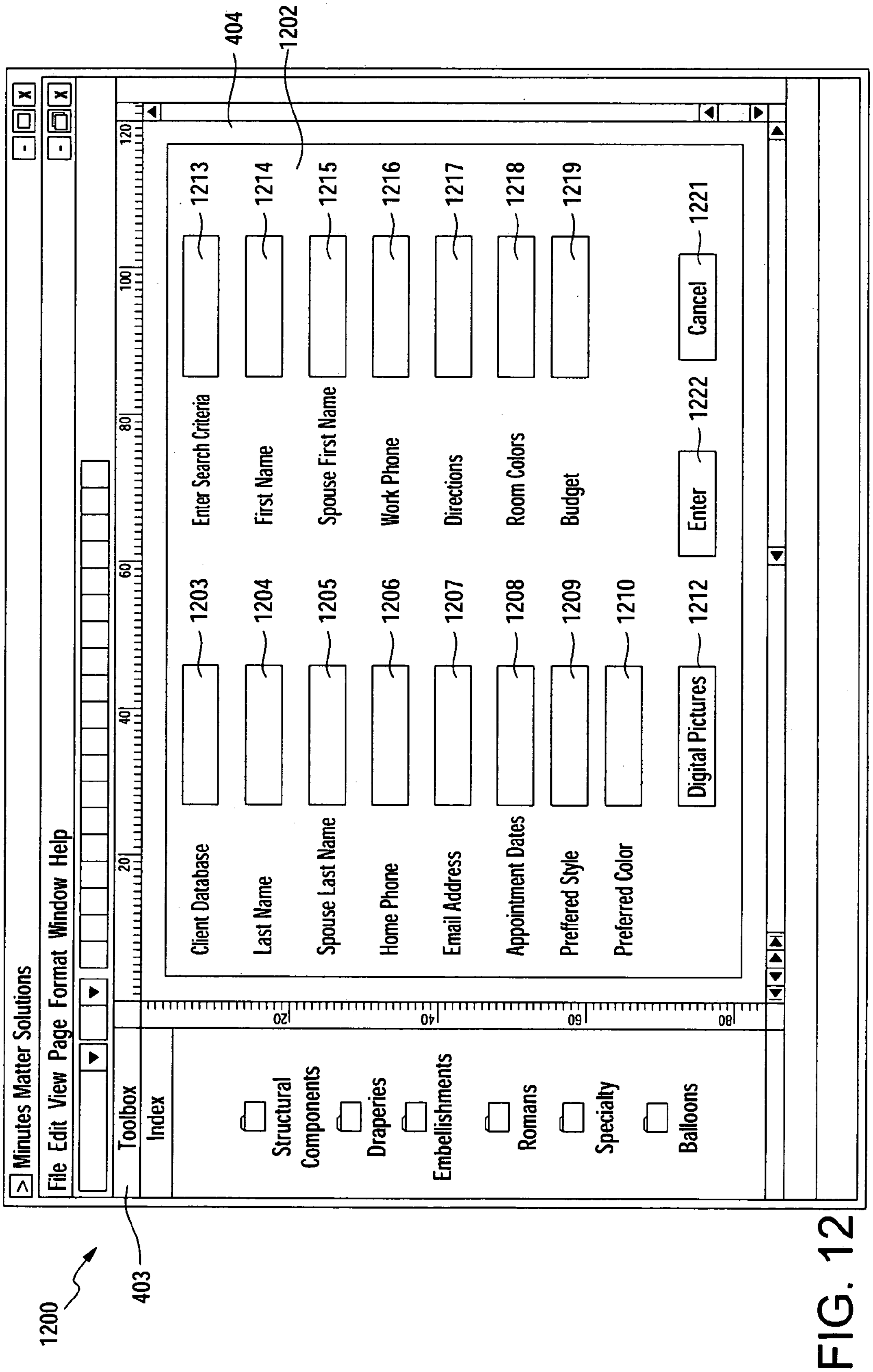
FIG. 12 illustrates an exemplary GUI of the interior design system of FIG. 3 exhibiting a client database search window in accordance with an embodiment of the present invention.

If the user selects open 1106 or new 1104, then the logic 312 displays the GUI 1200 illustrated in FIG. 12. The GUI 1200 of FIG. 12 depicts a client database text box 1202 that comprises numerous text fields 1203-1221 related to data corresponding to a client. Thus, the user may enter search criteria in text field 1213 in order to pull up data on an existing client. In this regard, the client database text box 1202 comprises text fields for the client's last name 1204, the client's first name 1214, the spouse's last name 1205, the spouse's first name 1215, home phone 1206, work phone 1216, email address 1207, directions to the client's residence 1217, appointment dates 1208, room colors 1218, preferred style 1209, budget 1219, and preferred color 1210. If the user selects the "enter" button 1222, then the client information is pulled up, if the user selects "cancel" 1221, then the database text box 1202 terminates. In addition, digital pictures of the client's residence or work place may be stored on the non-volatile storage medium 320 and the logic 312 may display the digital pictures to the user upon selection of the "digital pictures" button 1212.

Figure 13:
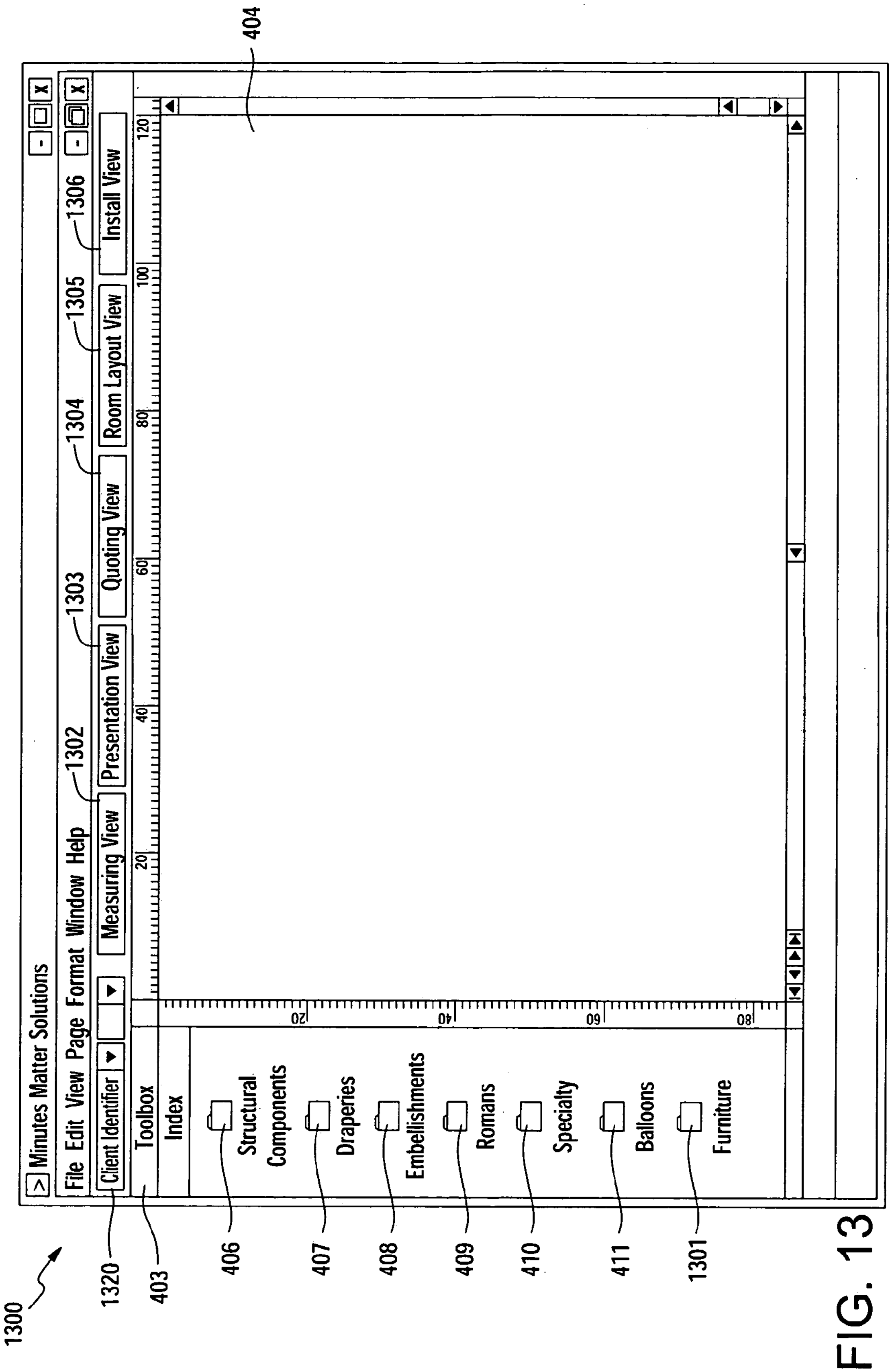
FIG. 13 illustrates an exemplary GUI of the interior design system of FIG. 3 exhibiting five distinct view buttons in accordance with an embodiment of the present invention.

After the user either selects an existing client or creates a new client, the logic 312 displays the GUI 1300 of FIG. 13 that identifies the client in the client identifier field 1320. In an exemplary embodiment of the present invention, the logic 312 also enables five (5) working views of the workshop 404, which are represented in the GUI 1300 of FIG. 13. In this regard, the GUI 1300 comprises a measuring view button 1302, a presentation view button 1303, a quoting view button 1304, a room layout view button 1305, and an install button 1306. Further, an additional furniture link 1301 is provided in the toolbox 403.

Generally, the logic 312 displays a measuring view GUI 1400 (FIG. 14) when a user selects the measuring view button 1302. Generally, the measuring view GUI 1400 displays graphics created for a client via the method described herein with reference to FIG. 4-FIG. 10. For illustrative purposes, with reference to FIG. 14, the user has selected single windows 1404 and 1406.

Figure 14:
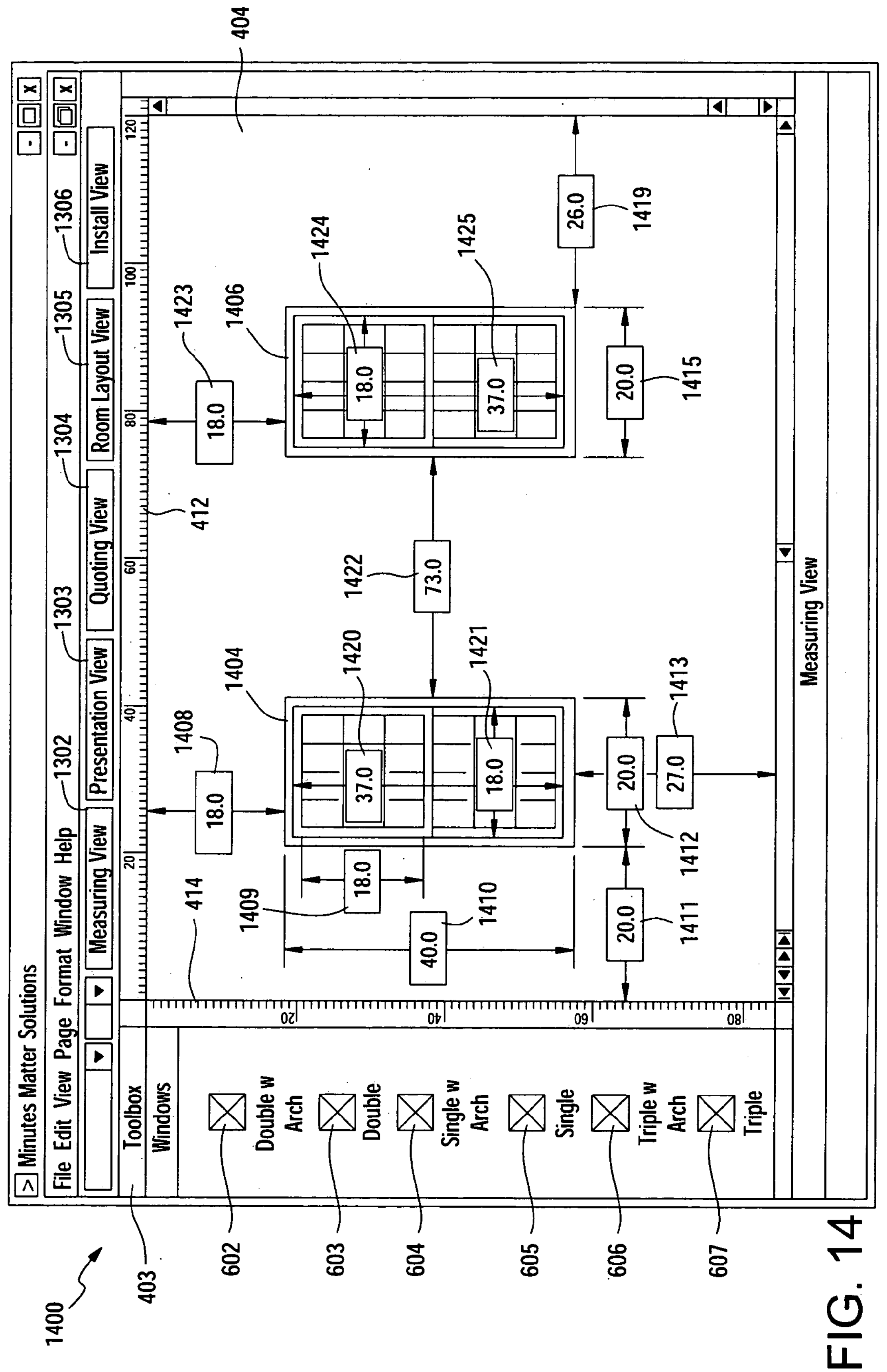
FIG. 14 illustrates an exemplary GUI of the interior design system of FIG. 3 exhibiting a measuring view having two window structural design components and their corresponding dimension text fields in accordance with an exemplary embodiment of the present invention.

When the user selects the measuring view button 1302, the logic 312 displays the graphics selected with associated text fields that define the exact measurements of the placement of the window components relative to the workshop 404, which illustrates a client-defined design area, i.e., a wall, that is 120 inches, i.e., ten feet, wide, as illustrated by ruler 412 and 72 inches in height, i.e., seven feet in height, as indicated by ruler 414. Thus, an exemplary embodiment as shown in FIG. 14 provides a scaled workshop of 1 inch=20 inches.

Thus, logic 312 displays in text fields 1408-1415 measurement values for each window corresponding to the real-world measurements. In this regard, logic 312 displays 18.0 inches in text field 1408, which indicates the distance from the top of the window 1404 to the ceiling at seven feet, 18.0 inches in text field 1409, which indicates the height of the upper sash, 40.0 inches in text field 1410, which indicates the height of the window 1404, 20.0 inches in text field 1411, which indicates the distance from the wall (not shown) to the bottom left corner of the window 1404, 20.0 inches in text field 1412, which represents the width of the window 1404, 27.0 inches in text field 1413, which indicates the distance from the floor (not shown) to the bottom of the window 1404, 37.0 inches in text field 1420, which indicates the inside length of the window 1404, and 18.0 inches in text field 1421, which indicates the inside width of the window 1404. In addition, the logic 312 displays 73.0 inches in text field 1422, which indicates the distance between the two windows 1404 and 1406. Further, the logic 312 displays 18.0 inches in text field 1423, which indicates the distance of the window from the ceiling, 18.0 inches in text field 1424, which indicates the width of the window 1406, and 37.0 inches in text field 1425, which indicates the inside length of the window 1406.

With reference to window 1406, the logic 312 displays measurements relative to the position to window 1404. Thus, the logic 312 displays 26.0 in text field 1419, which indicates the distance from the window 1406 to the opposite wall (not shown) and 20.0 in text field 1415, which indicates the width of the window 1406. Logic 312 may automatically fill in values into text fields or the user may enter values into the text fields, e.g., the user may enter 20.0 in text field 1412 to indicated the width of the window that the user is inserting into the workshop 404.

In another embodiment, the text fields 1408-1412 may be editable fields. In this regard, a user of the system may be able to enter data into the fields. Upon entry of the data, the logic 312 then places the graphics at the positions in the workshop 404 relative to the entered values. Thus, a user of the system does not necessarily have to have the system 300 when designing an interior. The user may remotely gather the measurement data, which may be recorded by writing such data on a document, then the user enters the data into the GUI 1400 subsequent to collecting the data.

Figure 15:
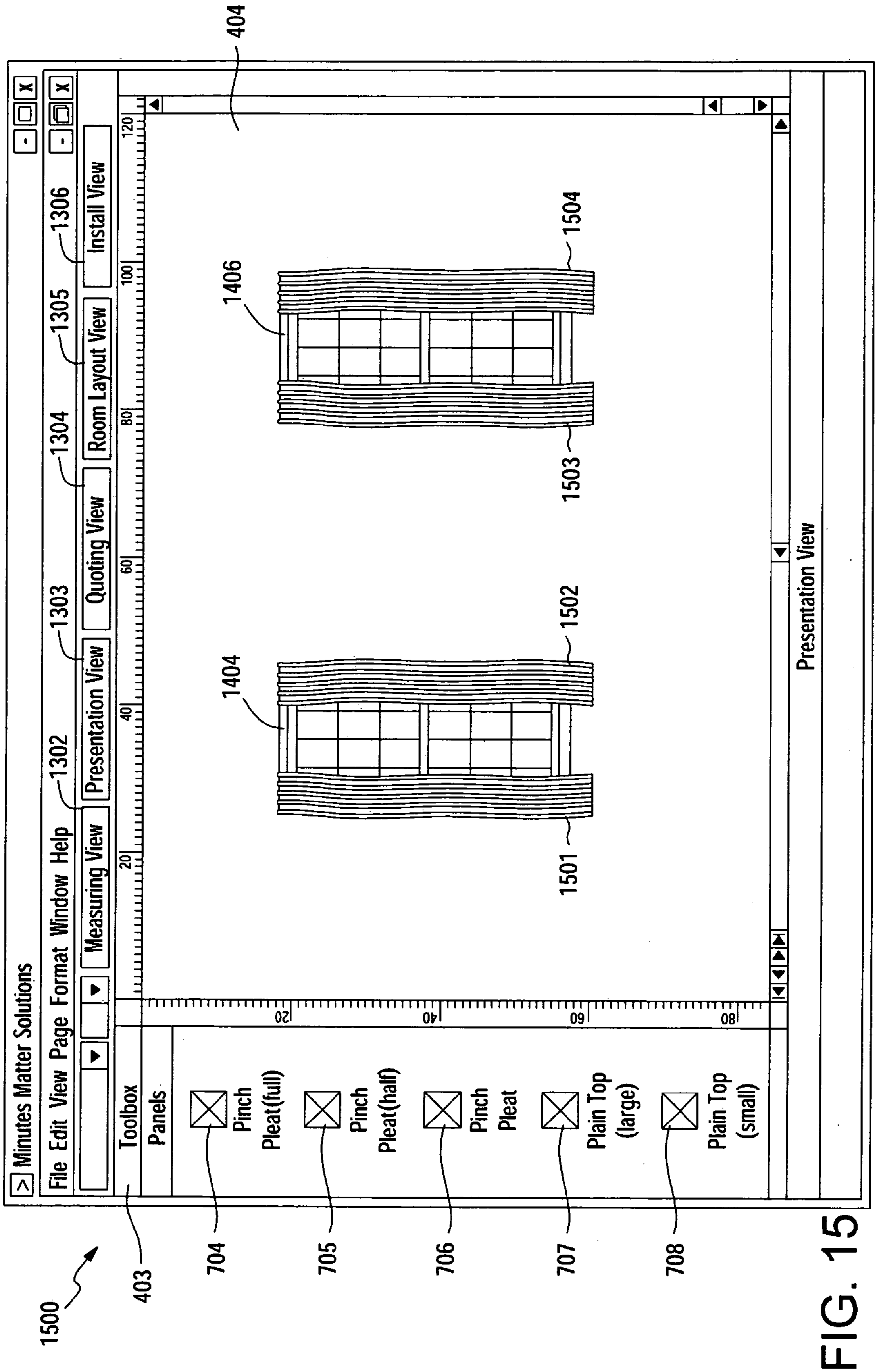
FIG. 15 illustrates an exemplary GUI of the interior design system of FIG. 3 exhibiting a presentation view having two window structural design components and four panel window treatment design components affixed thereto in accordance with an exemplary embodiment of the present invention.

The user may then select the presentation view button 1303, and the logic 312 then displays the GUI 1500 illustrated in FIG. 15. In the presentation view illustrated in GUI 1500 the logic 312 displays the windows 1404 and 1406 with the treatments as designed similarly to that described with reference to FIG. 4-FIG. 10. In the presentation view the dimensions, as shown in FIG. 14 with reference to the measurement view, are not visible. In the presentation view, the user may manipulate the toolbox 403, thereby selecting treatments, as described herein with reference to FIG. 4-FIG. 10.

Note that the logic 312 may provide a dialog box that allows a user to enter real world dimensions that the logic 312 uses to size the varying treatments selected and the windows corresponding thereto.

In another embodiment of the logic 312, the logic 312 receives input from the user that selects a digital picture of a client's wall on which the user is designing treatments for a window. The logic 312 then displays the digital picture relative to the presentation view and the various windows and treatments that may have been selected. Thus, the user can view, in the presentation view of FIG. 15 the actual wall for which the design is being created with the graphics superimposed thereon.

In another embodiment of the logic 312, a user may select, for example via a right click of an input device 306, a detail button (not shown), which displays a dialog box per each component selected and displayed by the logic 312 on the workshop 404. The user may then enter additional data relative to each component, such as, for example, the fabric that is to be used in creating the specific component, e.g., the panel or the swag.

In addition, in the presentation view, the logic 312 may enable a user to select on a particular component, such as, for example a finial that is used in the design, and the logic 312 retrieves the actual vendor name and a digital photograph illustrating in more detail the particular component. This type of enlargement and presentation of particular components relative to vendors may be done for other components as well, for example for fabric, trims, and other hardware. Further, digital pictures showing the various components may be manipulated so that the user can compare colors between, for example, a digital picture of a fabric and a digital picture of a trim.

Figure 16:
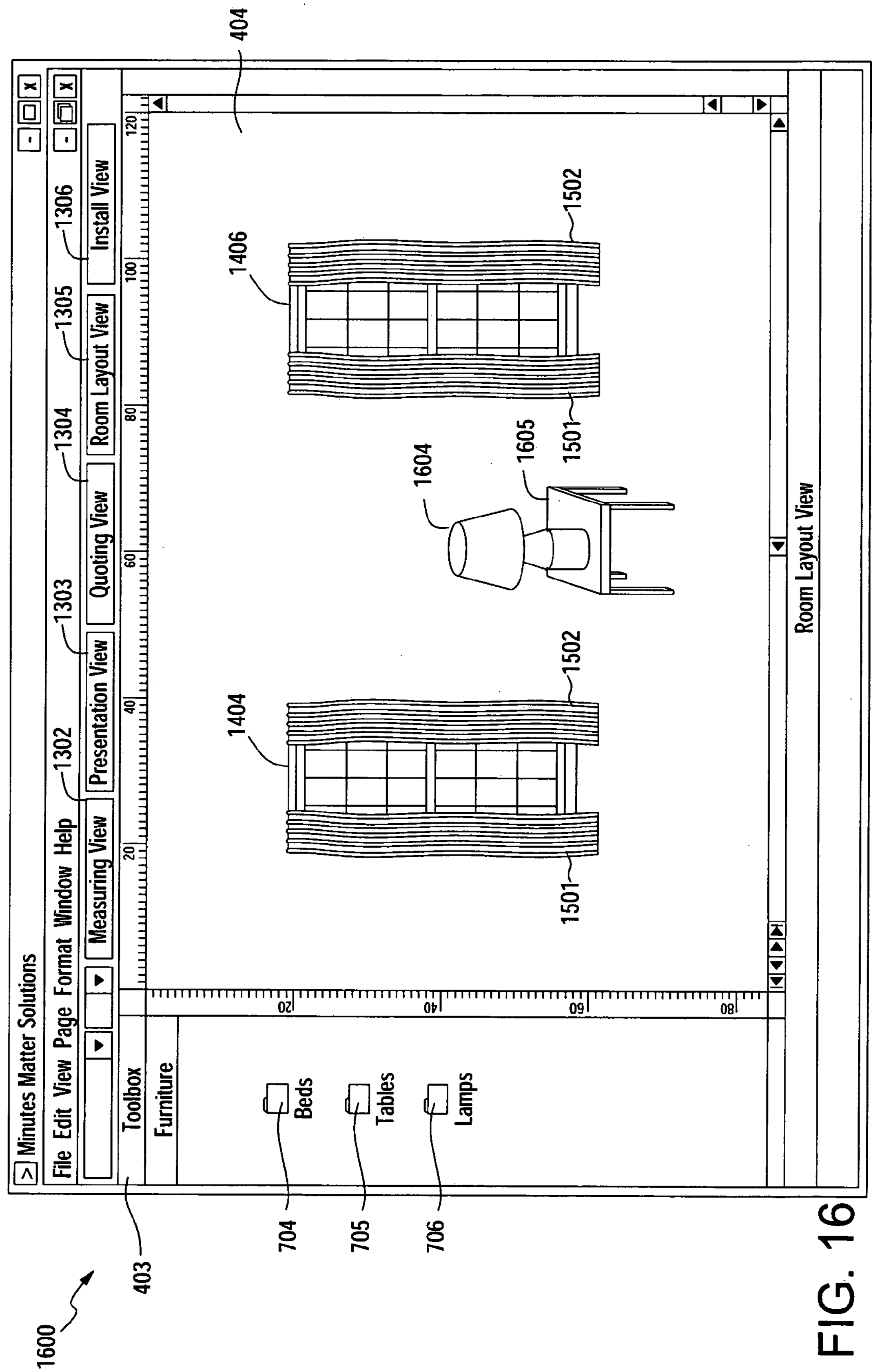
FIG. 16 illustrates an exemplary GUI of the interior design system of FIG. 3 exhibiting a layout view having two window structural design components, four panel window treatment design components, a table furniture design component, and a lamp accessory design component in accordance with an exemplary embodiment of the present invention.

The user may then select the layout view button 1305, and the logic 312 preferably displays the GUI 1600 illustrated in FIG. 16. Referencing back to FIG. 13, in the layout view as illustrated in FIG. 16, the user may desire to insert furniture into the view. Thus, the user selects the furniture link 1301 (FIG. 13) and toolbox 403 displays a set of links from which the user can select furniture graphics to insert into the layout view. In the exemplary layout view of FIG. 16, the user has selected a table 1605 from the table link 1602 and a lamp graphic 1604 from the lamps link 1603. Thus, the logic 312 displays to the user a graphical representation of the room represented by the layout view in the workshop 404.

As described herein with reference to FIG. 15, the furniture and accessories, i.e., the lamp, may be sized by the user via a dialog box (not shown). In this regard, the logic 312 would display a dialog box for the selected component, which would enable a user to enter size information into text fields. The logic 312 would then use the information entered to size the graphic in accordance with the real-world scale.

In addition, as described herein with reference to FIG. 10, colors, fabrics and the like may also be selected per furniture piece and accessory component dropped in the layout view. Further, an additional dialog box may be displayed by logic 312 that allows a user to enter in the name of the item that is being used in the graphic, the fabric, and the price of the fabric.

Figure 17:
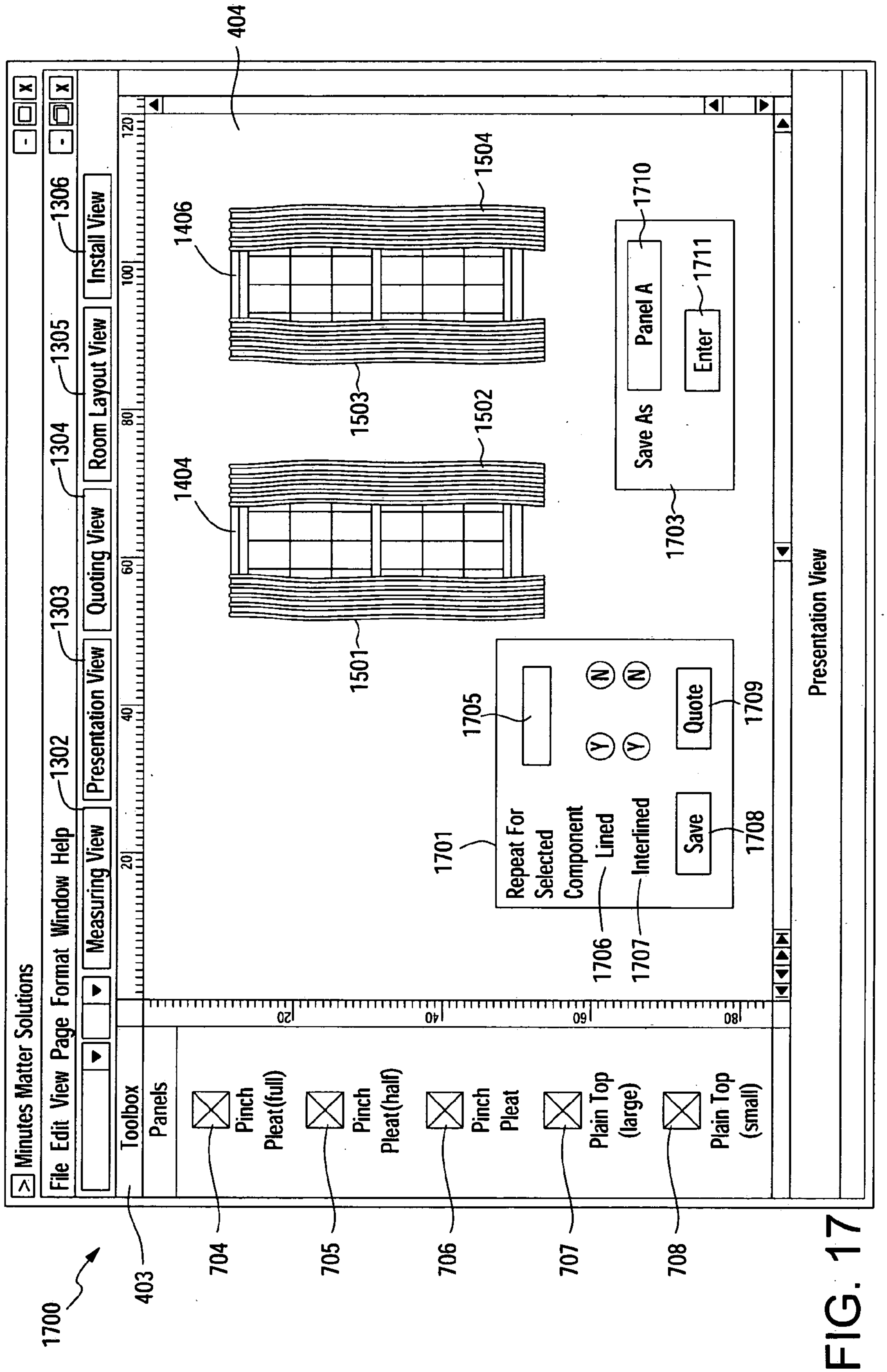
FIG. 17 illustrates an exemplary GUI of the interior design system of FIG. 3 exhibiting a yardage calculation quoting view having two window structural design components, four panel window treatment design components, and a specification box in accordance with an exemplary embodiment of the present invention.
Figure 18:
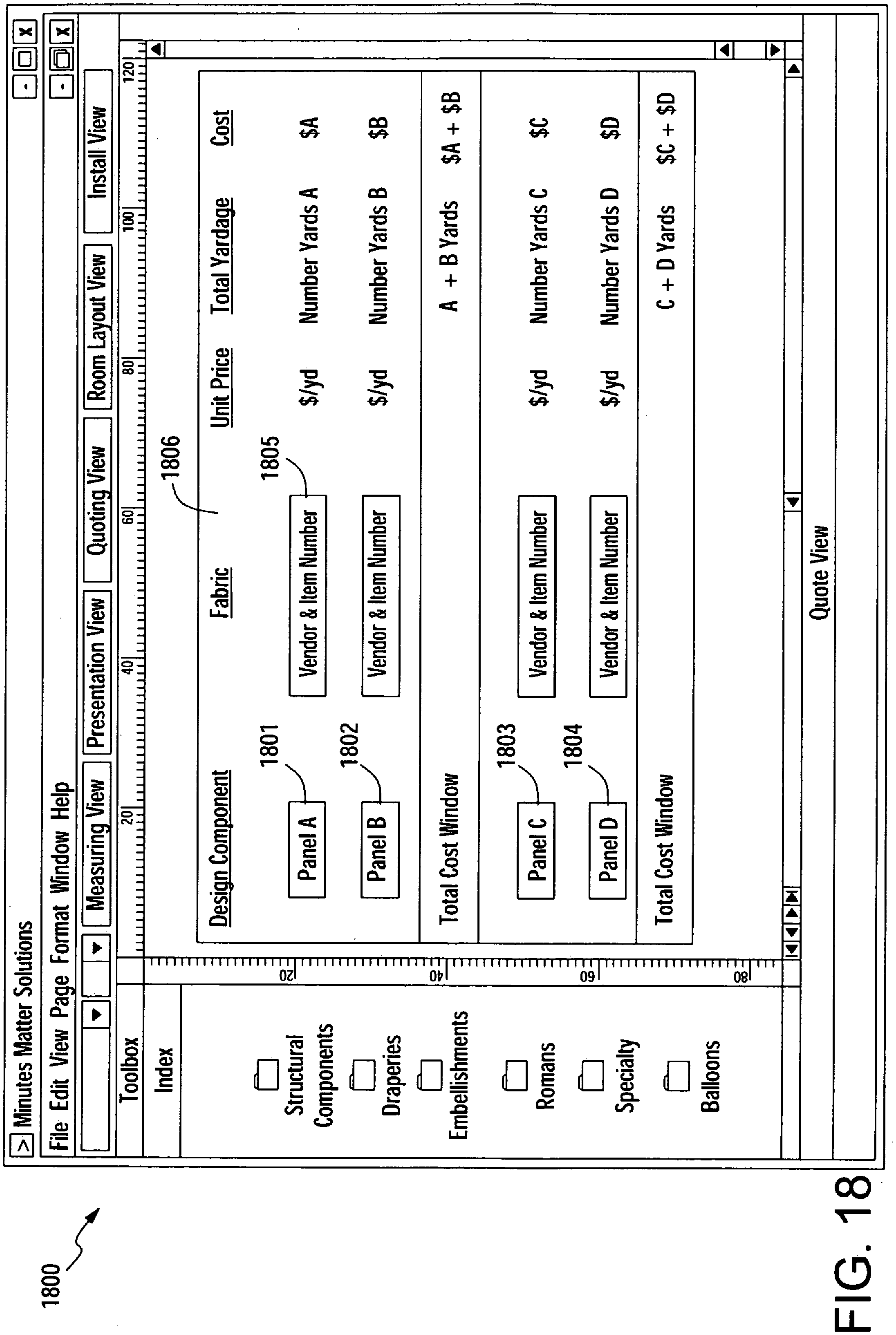
FIG. 18 illustrates an exemplary GUI of the interior design system of FIG. 3 exhibiting a quoting view that displays a window containing information to pricing of the structural design components, the window treatment design components, and/or the furniture design components in accordance with an exemplary embodiment of the present invention.

After window treatments have been sized, fabric can be calculated for cut lengths based upon a user's selection of components displayed in the presentation view illustrated in the GUI 1700 of FIG. 17. A user selects component(s), for example, panel 1501. The user then accesses the menu 1701 via the selected component. The logic 312 may enable such selection by displaying the menu 1701 when a user clicks the right button on an input device, i.e., a mouse.

The dialog box 1701 allows a user to enter a repeat for the selected components in text field 1705. In addition, the dialog box 1701 allows a user to indicate whether the component selected is lined 1706 or interlined 1707 via query buttons.

After the data is entered into the dialog box 1701 for the selected components, the user may select the "Save" button 1708. The logic 312 then displays the dialog box 1703, which allows the user to enter a name for the saved component(s) in text field 1710. After the user enters the name of the saved component(s), the user selects "Enter" button 1711.

After the user has obtained yardage for all the desired components, then the user can select the "Quote" button 1709. The logic 312 then displays the GUI 1800 illustrated in FIG. 18.

As noted herein, in order to effectuate the quote view functionality, each of the images corresponding to each of the design components that are stored in database 314 have embedded in the image relevant yardage calculations. For example, for a window treatment, the yardage is calculated by summing a finished length (FL), which is the actual length measurement of the treatment after installation, a hem amount, a break, i.e., the extra amount of fabric that lays on the floor, if there is a break in the design component, a mounting allowance, which is the extra amount of fabric needed to staple a treatment to a board or pole, a rod pocket (RP), which is the fabric needed to accommodate a rod, pole, etc. for window treatments, and a heading, which is the fabric that extends up past the rod or board. Therefore, for each design component the relevant values are stored embedded in the image or related thereto. Thus, when the design component is selected, the yardage is calculated for the selected component in accordance with the calculations corresponding to the image of the design component.

After calculation, the logic 312 displays a quote summary box 1806. The quote summary box specifically comprises a listing of the design components for which the user calculated yardage and saved the calculated yardage. Thus, as shown in FIG. 17, the user selected a component, panel component 1501 and saved that data with the identifier "Panel A" 1801. Although not specifically shown, data has assumedly been saved to "Panel B" 1802, "Panel C" 1803, and "Panel D" 1804. With reference to Panel A, the box 1806 further comprises a "fabric" column, a "unit price" column, a "total yardage" column, and a "cost" column. Thus for Panel A, the vendor and item number for the fabric is displayed by the logic 312 at button 1805. The unit price is displayed, the number of yards calculated is displayed and the total cost is displayed. For each component saved, the logic calculates each components individual numbers, then the logic calculates a total of yards, e.g., "A+B", and a total cost "$A+$B."

Figure 19:
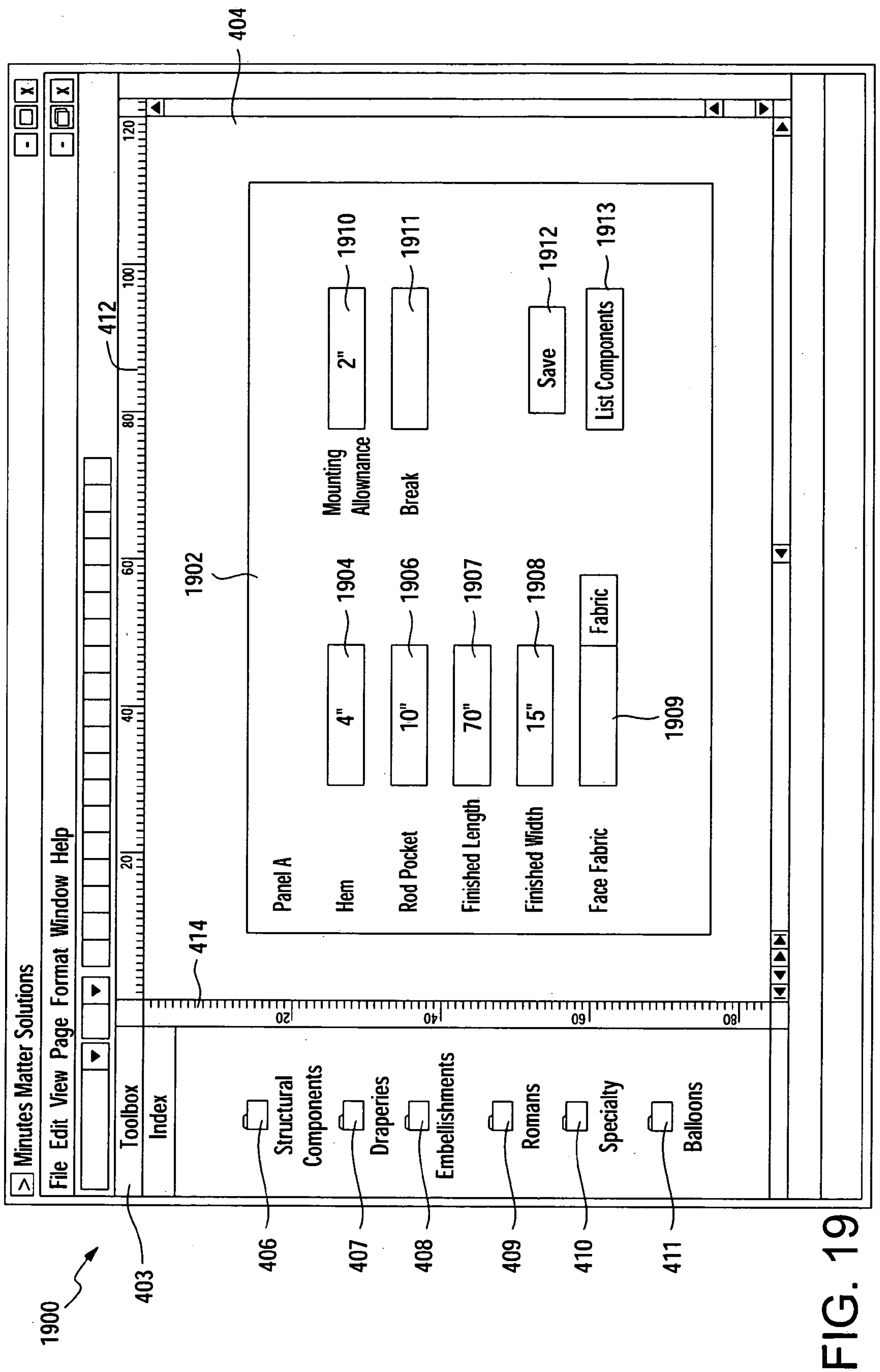
FIG. 19 illustrates an exemplary GUI of the interior design system of FIG. 3 exhibiting an quote view in accordance with an exemplary embodiment of the present invention.

Note that the buttons 1801-1805 can be interactive. In this regard, a user may select, for example on the Panel A button 1801, and the GUI 1900 illustrated in FIG. 19 is displayed by the logic 312.

The dialog box 1902 might then provide the user with the particular component characteristics relevant to the component. For Panel A, the relevant characteristics are the hem value in text field 1904, the rod pocket value in text field 1906, the finished length value in text field 1907, the finished width value in text field 1908, and the mounting allowance in text field 1910. Other values that may be entered include a face fabric value in text field 1909 and a break value in text field 1911. As shown, the break 1911 is optional, which is indicated by the blank text field. The user can then change the values in the text fields and save the changes via the "Save" button 1912 and/or the user can list the other components for which data has been saved.

Figure 20:
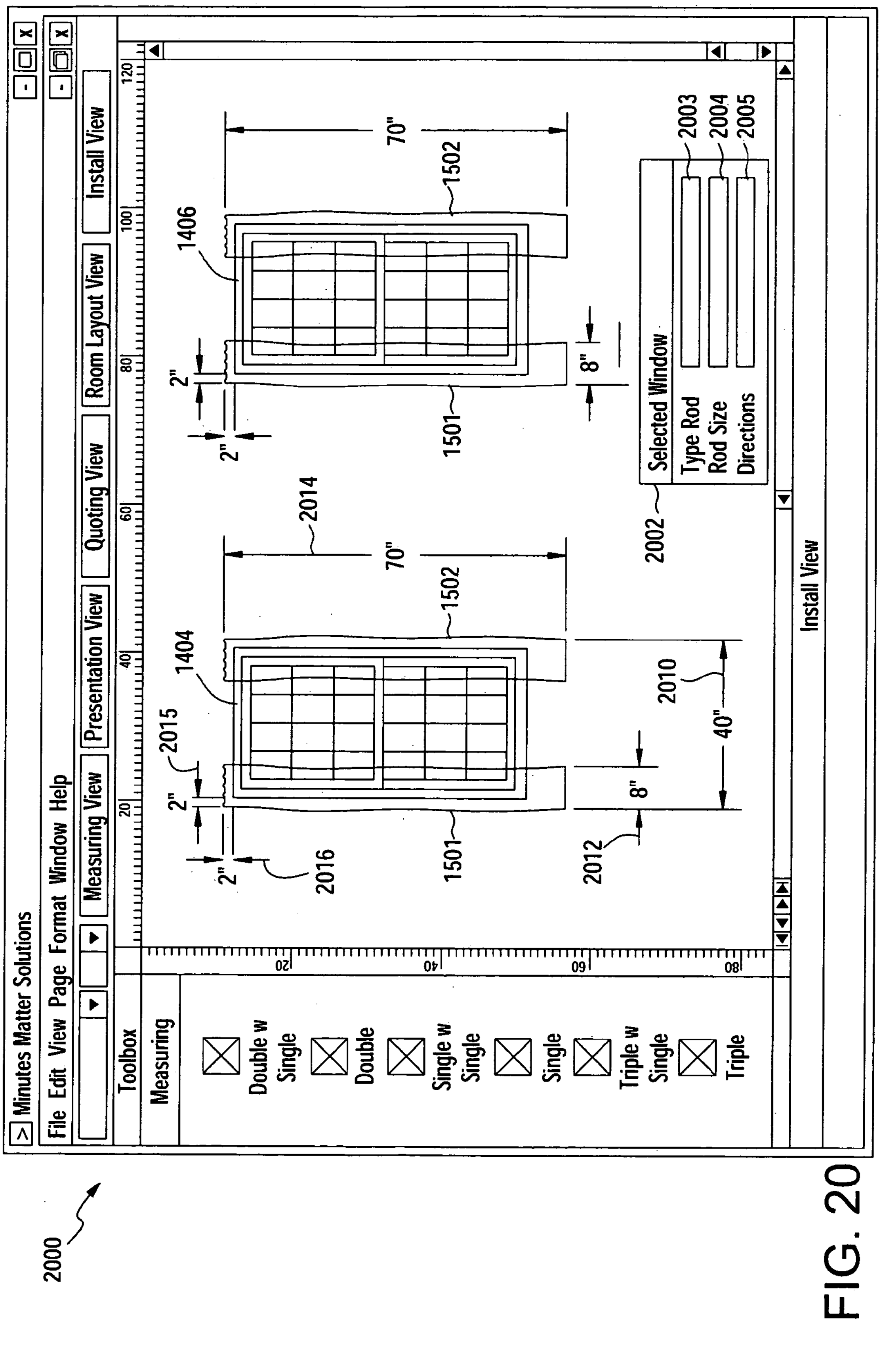
FIG. 20 illustrates an exemplary GUI of the interior design system of FIG. 3 exhibiting an install view in accordance with an exemplary embodiment of the present invention.

When the user selects the "install view" button 1306, the logic 312 displays the GUI 2000 illustrated in FIG. 20. The install view shows the windows 1404 and 1406 as designed herein with reference to FIG. 15-17. However, the display of the components is such that one who installs the treatments can use the view to determine where, for example, mounting boards might be mounted. Thus, in the install view, the treatments 1501-1504 are transparent, and the relevant measurements for installing the treatments are displayed. Thus, with reference to window 1404, each treatment 1501 and 1502 is to be mounted two (2) inches above the top of the window 1404. Further, the mounting should be two (2) inches to the left of the window 1404 on the left side and two (2) inches to the right of the window 1404 on the right side. Likewise with reference to window 1406.

In addition to the mounting measurements, the install view illustrated in GUI 2000 preferably comprises a dialog box 2002 that enables entry of data corresponding to the type of rod 2003, the size of the rod 2004, and any other directions 2005 that the user determines might aid in installment of the treatments. Also, the dialog box may be used to display to the installer such information as it was entered.

Figure 21:
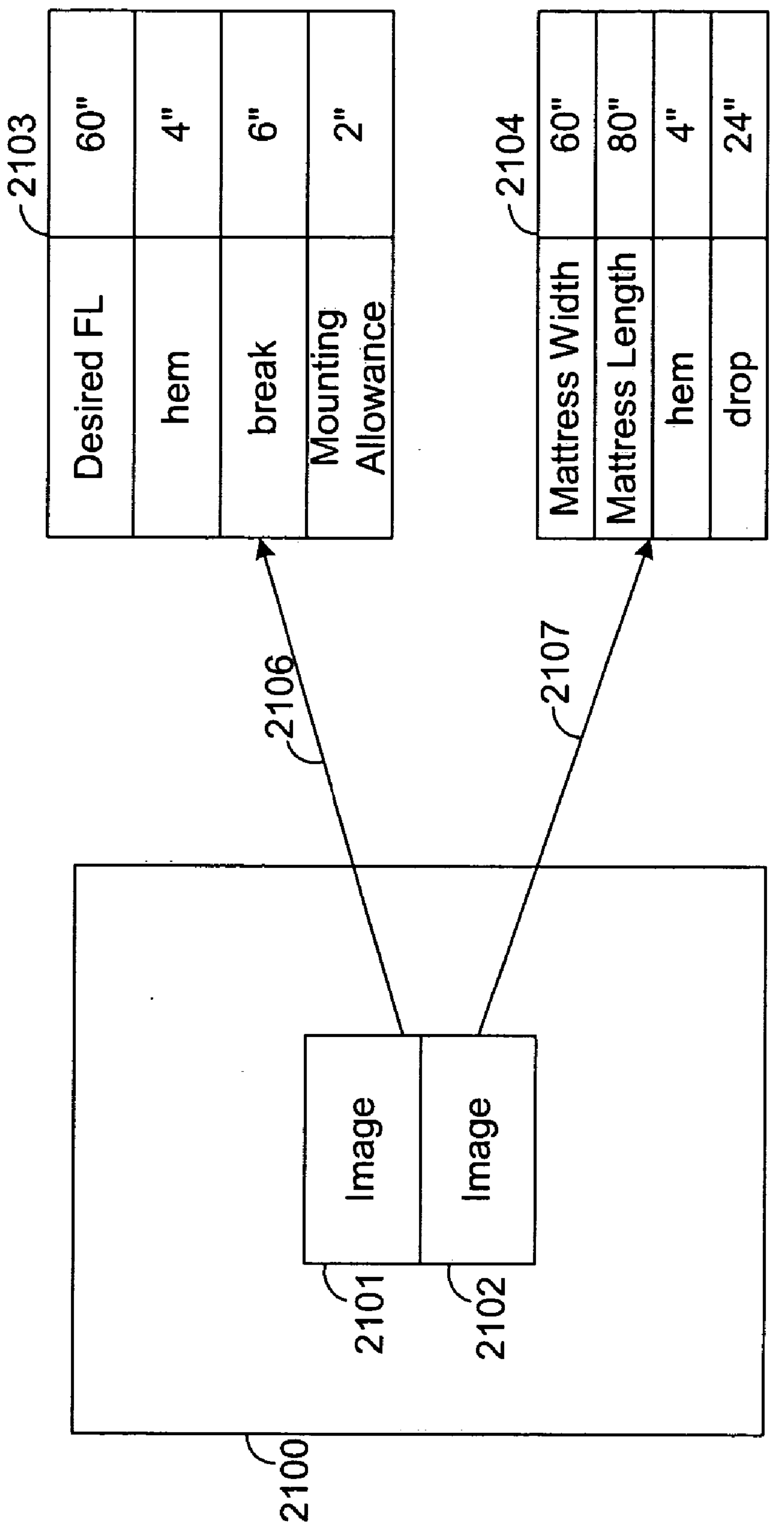
FIG. 21 illustrates an exemplary database structure of the database of FIG. 3 in accordance with an exemplary embodiment of the present invention.

FIG. 21 illustrates an exemplary database table for a component as described herein with reference to FIG. 2A-FIG. 20. Note that each design component is preferably stored in the database 314 as an image file, e.g., image 2101 and image 2102. The image 2101 and 2102 may comprise pointers 2106 and 2107 that establish an association between the image file 2101 and 2102 and a table 2103 and 2104 that contains the relevant component characteristic data, e.g., hem, finished length.

Figure 22:
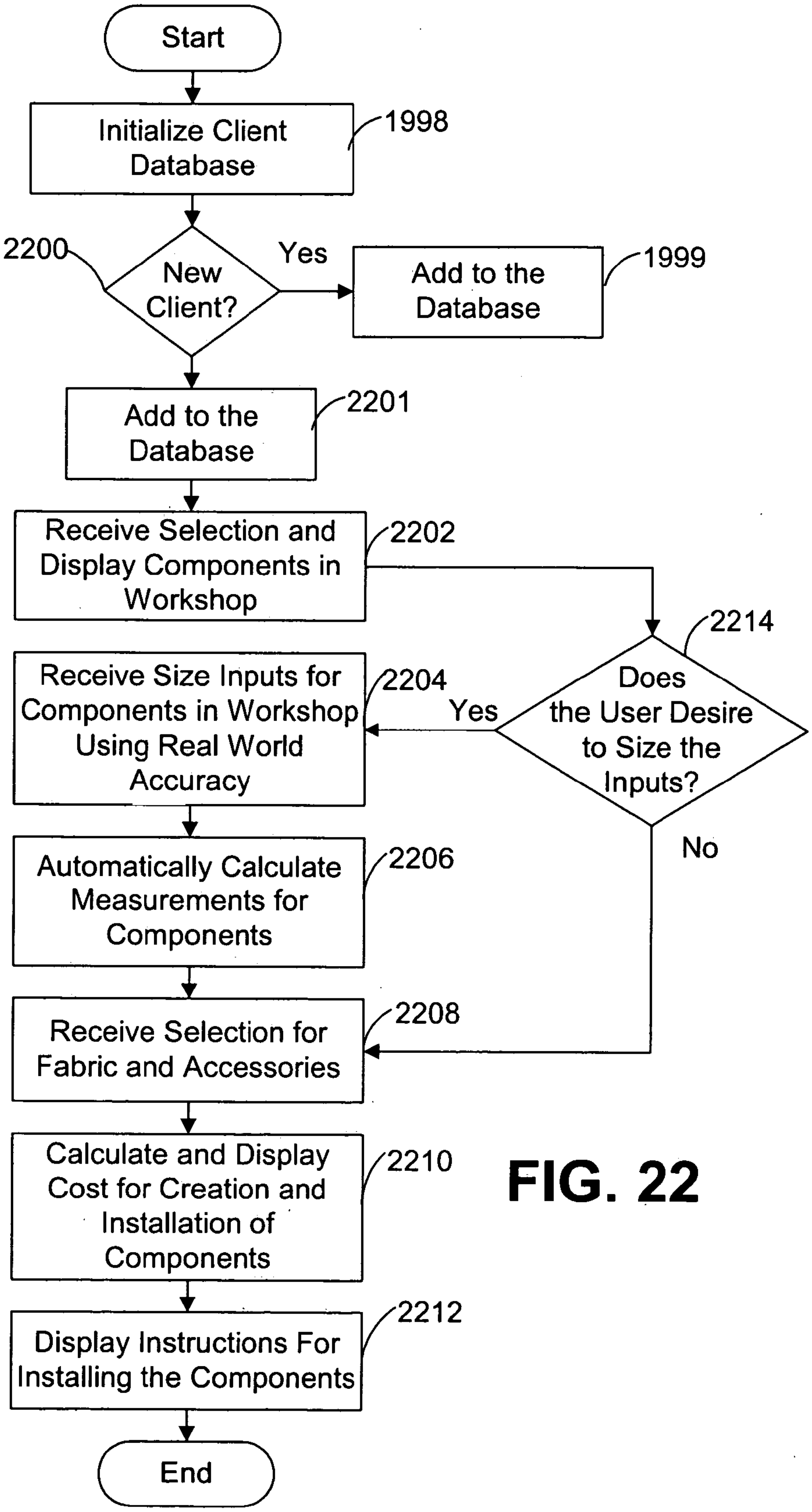
FIG. 22 illustrates an exemplary architecture and functionality of the interior design system of FIG. 3.

FIG. 22 is an exemplary architecture and functionality of the interior design system of the present invention.

Initially the logic 312 initializes the client database, as indicated in step 1998. If the user enters a new client identifier, as indicated in step 2200, then the logic 312 adds the client information to the database, as indicated in step 1999. If the client is not a new client, as indicated in step 2200, then the logic 312 retrieves the existing client information, as indicated in step 2201.

The logic 312 receives component selections and displays selection in workshop 404, as indicated in step 2202. In an exemplary embodiment, a user selects components from a toolbox 403, drags the selection to the workshop 404, and drops the component onto the workshop.

The logic 312 then receives selections and displays components in the workshop 404. If the user desires to manually size the inputs, as indicated in step 2014, then the logic 312 receives inputs from the user, which reflect real-world accuracy. In this regard, the logic 312 may enable the user to select and scale each component or it may receive size inputs from a dialog box that enables a user to enter sizes in text fields.

The logic 312 then calculates and displays measurements related to the components dropped in the workshop 404, as indicated in step 2206. The logic 312 may display the measurements in text fields associated with the various dimensions of the components, or it may enable a user to enter data into the text fields related to the dimensions, and the logic 312 then sizes the components to reflect the user's input.

If the user does not desire to size the components dropped into workshop 404, as indicated in step 2214, then the logic receives fabric and accessory selections, as indicated in step 2208. The user may select fabric from choices that the logic 312 displays in a dialog box when the user selects the component for which the user desires to select a fabric. Further, the user may select accessories from the toolbox 403. Note that if the user desires to select size components in step 2214, then the logic proceeds to step 2208, as well, after automatically calculating sizes not entered by the user.

The logic 312 calculates and displays the costs for creation and installation of the selected components, as indicated in step 2210, and displays instruction for installing the components, as indicated in step 2212.

The invention claimed is:

1. An interior design system for assisting users in designing window treatments, comprising:

memory for storing data defining images of a plurality of window treatment design components and a digital photograph of at least a building wall to be decorated, the digital photograph depicting at least one window within the wall; and logic configured to receive an input selecting at least one of the window treatment design components and to display the digital photograph, the logic further configured to display, based on the input, an image of the at least one window treatment design component such that the image of the at least one window treatment design component is superimposed on the displayed photograph, wherein the logic is configured to display the digital photograph and the image of the at least one window treatment design component in a workshop of a graphical user interface, the logic further configured to automatically size the image of the at least one window treatment design component to scale within the workshop based on a dimension value indicative of a dimension for the at least one window treatment design component, and wherein the logic is configured to calculate, based on the dimension value, a cost associated with the at least one window treatment design component, the logic further configured to display a value indicative of the calculated cost, wherein the logic is configured to calculate the cost based on a plurality of values associated with the image of the at least one window treatment design component, the plurality of values including a value indicative of a finished length and a value indicative of an amount fabric estimated for a break.

2. The system of claim 1, wherein the logic is further configured to receive an input indicating a value for a distance from a first location to a second location within the workshop, the logic further configured to scale at least one dimension within the workshop based on the value.

3. The system of claim 2, wherein the logic is configured to automatically position the at least one window treatment design component in said workshop based on the value.

4. The system of claim 2, wherein the logic is configured to receive an input indicating a distance of a first object from a second object within the workshop, the logic further configured to scale the distance based on the value and to automatically position the second object within the workshop based on the scaled distance.

5. The system of claim 2, wherein the logic is configured to display a graphical reference extending from a first object in the workshop to a second object within the workshop, the logic further configured to display a text field associated with the graphical reference, wherein logic is configured to scale a distance from the first object to the second object based on a value received via the text field and the value for the distance from the first location to the second location, and wherein the logic is configured to position the first object based on the scaled distance.

6. The system of claim 5, wherein the graphical reference comprises an arrow.

7. The system of claim 1, wherein the logic is further configured to display a first graphical reference indicating a distance between a first object and a second object within the workshop, the logic configured to display a first text field associated with the first graphical reference and to receive, via the first text field, a value for the distance, wherein the logic is configured to calculate the dimension for the at least one window treatment design component based on the value received via the first text field and to display the calculated dimension in a second text field associated with a second graphical reference indicating the calculated dimension.

8. The system of claim 7, wherein each of the first and second graphical references comprises an arrow.

9. The system of claim 1, wherein the logic is further configured to receive a user input value for a distance from a first location within the workshop to the image of the at least one window treatment design component, the logic configured to scale the value and to automatically position the image of the at least one window treatment design component within the workshop based on the scaled value.

10. A computer-readable medium storing an executable program for assisting users in designing window treatments, comprising:

logic for storing data defining images of a plurality of window treatment design components;

logic for displaying a digital photograph of at least a building wall to be decorated, the digital photograph depicting at least one window within the wall;

logic for selecting, based on user input, at least one of the window treatment design components;

logic for displaying, based on the selecting logic, an image of the at least one window treatment design component such that the image of the at least one window treatment design component is superimposed on the displayed photograph;

logic for sizing the image of the at least one window treatment design component based on a scaled dimension; and logic for calculating a cost associated with the at least one window treatment design component, wherein the calculated cost is based on a plurality of values associated with the image of the at least one window treatment design component, the plurality of values including a value indicative of a finished length and a value indicative of an estimated amount of fabric for a break.

11. An interior design method for designing window treatments, comprising the steps of:

storing in memory data defining images of a plurality of window treatment design components;

displaying, via a display device, a digital photograph of at least a building wall to be decorated, the digital photograph depicting at least one window within the wall;

selecting, based on user input, at least one of the window treatment design components;

displaying, via the display device and based on the selecting step, an image of the at least one window treatment design component such that the image of the at least one window treatment design component is superimposed on the displayed photograph;

calculating a cost associated with the at least one window treatment design component, wherein the calculated cost is based on a plurality of values associated with the image of the at least one window treatment design component, the plurality of values including a value indicative of a finished length and a value indicative of an estimated amount of fabric for a break; and displaying, via the display device, the calculated cost.

12. The method of claim 11, further comprising the step adjusting a size of the image of the at least one window treatment such that the image of the at least one window treatment appears to scale relative to the window in the displayed photograph.

13. The method of claim 12, further comprising the step of receiving a value for a distance between a first abject and a second object of the workshop, wherein the adjusting step is based on the value.

14. The method of claim 12, wherein the displaying steps are performed such that the digital photograph and the image of the at least one window treatment are displayed within a workshop of a graphical user interface.

15. The method of claim 14, further comprising the step of receiving a user input indicating a value for a distance from a first location to a second location within the workshop, wherein the adjusting step is based on the value.

16. The method of claim 12, further comprising the steps of:

displaying a graphical reference indicative of a distance within the workshop;

displaying a text field associated with the graphical reference;

receiving a value via the text field; and positioning the first object within the workshop based on the value received via the text field.

17. The method of claim 16, wherein the graphical reference comprises an arrow.

18. An interior design system for assisting users in designing window treatments, comprising:

memory for storing data defining images of a plurality of window treatment design components and a digital photograph of at least a building wall to be decorated, the digital photograph depicting at least one window within the wall; and logic configured to receive an input selecting at least one of the window treatment design components and to display the digital photograph, the logic further configured to display, based on the input, an image of the at least one window treatment design component such that the image of the at least one window treatment design component is superimposed on the displayed photograph, wherein the logic is configured to display the digital photograph and the image of the at least one window treatment design component in a workshop of a graphical user interface, the logic further configured to automatically size the image of the at least one window treatment design component to scale within the workshop based on a dimension value indicative of a dimension for the at least one window treatment design component, and wherein the logic is configured to calculate based on the dimension value, a cost associated with the at least one window treatment design component, the logic further configured to display a value indicative of the calculated cost, wherein the image of the at least one window treatment design component is associated with data for enabling the logic to calculate the cost, wherein the logic is configured to calculate the cost based on the data, and wherein the data indicates amounts to be calculated for fabric of each of the following group: a hem, a break, a mounting allowance, a rod pocket, and a heading.

19. The system of claim 18, wherein the cost is based on labor cost associated with the at least one window treatment design component.

* * * * *